United States Patent
Ying et al.

(10) Patent No.: US 10,959,132 B2
(45) Date of Patent: Mar. 23, 2021

(54) HANDOVER METHOD AND APPARATUS

(71) Applicant: Huawei Technologies Co., Ltd., Shenzhen (CN)

(72) Inventors: Jiangwei Ying, Beijing (CN); Yanmei Yang, Beijing (CN); Zhenglei Huang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 16/234,857

(22) Filed: Dec. 28, 2018

(65) Prior Publication Data

US 2019/0141583 A1 May 9, 2019

Related U.S. Application Data

(63) Continuation of application No. PCT/CN2016/090005, filed on Jul. 14, 2016.

(30) Foreign Application Priority Data

Jul. 1, 2016 (WO) ............... PCT/CN2016/088189

(51) Int. Cl.
*H04W 36/00* (2009.01)
*H04W 36/38* (2009.01)
(Continued)

(52) U.S. Cl.
CPC ... *H04W 36/0033* (2013.01); *H04W 36/0016* (2013.01); *H04W 36/08* (2013.01);
(Continued)

(58) Field of Classification Search
None
See application file for complete search history.

(56) References Cited

U.S. PATENT DOCUMENTS

| 8,331,224 B2 * | 12/2012 | Meirosu | H04W 28/08 370/229 |
| 2007/0104116 A1 | 5/2007 | Olvera-Hernandez | |

(Continued)

FOREIGN PATENT DOCUMENTS

| CN | 102740270 A | 10/2012 |
| CN | 103582020 A | 2/2014 |

(Continued)

OTHER PUBLICATIONS

"Solution: shared and dedicated network functions for network slicing," SA WG2 Meeting #114, Sophia Antipolis, S2-161785(revision of S2-16xxxx) (Apr. 11-15, 2016).

(Continued)

*Primary Examiner* — Bob A Phunkulh
(74) *Attorney, Agent, or Firm* — Leydig, Voit & Mayer, Ltd.

(57) ABSTRACT

This application provides a handover method, including: determining, by a mobility management (MM) network element, to hand over a session management (SM) for a user equipment (UE), and selecting target SM network element; and triggering, by the mobility management network element, a process of setting up a channel by the target SM network element, where the channel includes a user plane data channel between a target user plane (UP) function entity and a target base station. Therefore, it is possible to hand over a network in which a control plane (CP) is separated from a UP and an MM and an SM in the CP are separated from each other.

15 Claims, 21 Drawing Sheets

(51) Int. Cl.
*H04W 36/24* (2009.01)
*H04W 36/08* (2009.01)
*H04W 64/00* (2009.01)

(52) U.S. Cl.
CPC ......... *H04W 36/24* (2013.01); *H04W 36/385* (2013.01); *H04W 64/00* (2013.01)

(56) References Cited

U.S. PATENT DOCUMENTS

| | | | | |
|---|---|---|---|---|
| 2007/0213060 A1* | 9/2007 | Shaheen | | H04W 36/12 |
| | | | | 455/436 |
| 2007/0291695 A1* | 12/2007 | Sammour | | H04W 36/02 |
| | | | | 370/331 |
| 2009/0176496 A1* | 7/2009 | Li | | H04W 36/12 |
| | | | | 455/437 |
| 2010/0260099 A1* | 10/2010 | Frost | | H04W 36/0022 |
| | | | | 370/328 |
| 2010/0322128 A1* | 12/2010 | Becker | | H04L 67/14 |
| | | | | 370/312 |
| 2011/0122845 A1* | 5/2011 | Meirosu | | H04W 36/0055 |
| | | | | 370/332 |
| 2011/0274087 A1* | 11/2011 | Liang | | H04W 8/082 |
| | | | | 370/331 |
| 2014/0213264 A1* | 7/2014 | Park | | H04W 36/0055 |
| | | | | 455/438 |
| 2015/0156660 A1* | 6/2015 | Luo | | H04W 8/18 |
| | | | | 370/230 |
| 2015/0215822 A1* | 7/2015 | Won | | H04W 36/00 |
| | | | | 370/331 |
| 2015/0215834 A1* | 7/2015 | Qi | | H04W 24/10 |
| | | | | 370/331 |
| 2015/0223134 A1 | 8/2015 | Hou et al. | | |
| 2015/0282017 A1 | 10/2015 | Wang et al. | | |
| 2015/0365845 A1* | 12/2015 | Lonka | | H04L 45/38 |
| | | | | 370/236 |
| 2016/0119830 A1* | 4/2016 | Iwai | | H04W 76/10 |
| | | | | 370/331 |
| 2016/0219476 A1* | 7/2016 | Onishi | | H04W 36/0066 |
| 2016/0337915 A1 | 11/2016 | Tan et al. | | |
| 2017/0078874 A1* | 3/2017 | Lee | | H04W 36/0055 |
| 2017/0135010 A1* | 5/2017 | Iwai | | H04W 60/06 |
| 2017/0142624 A1* | 5/2017 | Brown | | H04W 36/12 |
| 2017/0181122 A1* | 6/2017 | Kim | | H04W 8/02 |
| 2017/0195926 A1* | 7/2017 | Iwai | | H04W 36/12 |
| 2017/0251357 A1* | 8/2017 | Iwai | | H04W 40/02 |
| 2017/0310585 A1* | 10/2017 | Kim | | H04L 45/38 |

FOREIGN PATENT DOCUMENTS

| | | |
|---|---|---|
| CN | 103731811 A | 4/2014 |
| EP | 2908566 A1 | 8/2015 |
| RU | 2392758 C2 | 6/2010 |
| WO | 2015113288 A1 | 8/2015 |

OTHER PUBLICATIONS

"Assignment of CP and UP network functions during an MM procedure," SA WG2 Meeting #115, Nanjing, P.R. China, S2-162744(Revision of S2-162614) (May 23-27, 2016).

* cited by examiner

HANDOVER METHOD AND APPARATUS

CROSS-REFERENCE TO RELATED APPLICATIONS

This application is a continuation of International Application No. PCT/CN2016/090005, filed on Jul. 14, 2016, which claims priority to International Application No. PCT/CN2016/088189, filed on Jul. 1, 2016. The disclosures of the aforementioned applications are hereby incorporated by reference in their entireties.

TECHNICAL FIELD

This application relates to the communications field, and in particular, to a handover method and apparatus.

BACKGROUND

Update and upgrade of mobile communications technologies will undoubtedly bring a variety of innovative applications to all lines of business and industries. Mobile broadband, multimedia, machine type communication, industrial control, and an intelligent transportation system will become main cases in the 5G era. To meet service requirements that vary widely, a 5G network will be flexibly built. A potential trend is to separate a control plane (CP) function from a user plane (UP) function, and separate a mobility management (MM) function from a session management (SM) function in the CP.

A 5G network slice includes a control plane function (CPF) entity and a user plane function (UPF) entity. The CPF entity mainly completes MM functions such as device access authentication, security encryption, and location registration and SM functions such as setup, release, and modification of a user plane transmission path. The UPF entity mainly completes functions such as routing and forwarding of user plane data.

FIG. 1 is a schematic diagram of an architecture of a network slice.

A core network in each network slice has a plurality of SM network elements and UPF entities, and different network slices share one MM entity. There is a signaling interface between a RAN and an MM, and there is a data plane interface between the RAN and a UPF. There is a signaling interface between a user database and the MM; and there is a signaling interface between the user database and the SM. Alternatively, there may be a signaling interface between the MM and an SM of each network slice. There may be a signaling interface between the RAN and the SM, or there may be no direct interface between the RAN and the SM, but the MM is needed to transfer signaling between the RAN and the SM.

However, currently, there is no handover method based on the architecture shown in FIG. 1.

SUMMARY

This application provides a handover method and apparatus, to provide a method and an apparatus for handing over a network in which a CP is separated from a UP and an MM and an SM in the CP are separated from each other.

A first aspect of this application provides a handover method, including: determining, by a mobility management network element, to hand over a session management SM for user equipment UE, and selecting a target session management SM network element; and triggering, by the mobility management network element, a process of setting up a channel by the target SM network element, where the channel includes a user plane data channel between a target user plane function entity and a target base station. Therefore, it is possible to hand over a network in which a CP is separated from a UP and an MM and an SM in the CP are separated from each other.

A second aspect of this application provides a mobility management network element, including a processor and a communications component. The processor is configured to: determine to hand over a session management SM for user equipment UE, and select a target session management SM network element. The communications component is configured to trigger a process of setting up a channel by the target SM network element, where the channel includes a user plane data channel between a target user plane function entity and a target base station.

In an implementation, the triggering, by the mobility management network element, a process of setting up a channel by the target SM network element includes: sending, by the mobility management network element to the target SM network element, a user equipment identifier UE ID, an address of a source SM network element, and information indicating an address of the target base station, where the information indicating the address of the target base station includes the address of the target base station or information to be mapped to the address of the target base station.

In an implementation, the triggering, by the mobility management network element, a process of setting up a channel by the target SM network element includes: sending, by the mobility management network element, an address of the target SM network element to the target base station; and sending, by the target base station to the target SM network element, a UE ID, an address of a source SM network element, and a parameter used to set up the user plane data channel between the UPF 2 and the target base station and used for downlink transmission.

In an implementation, the triggering, by the mobility management network element, a process of setting up a channel by the target SM network element includes: sending, by the mobility management network element to a source SM network element, a UE ID, information indicating an address of the target base station, and an address of the target SM network element; and sending, by the source SM network element, the UE ID, the information indicating the address of the target base station, and a parameter used to set up the user plane data channel between the target user plane function entity and the target base station and used for downlink transmission, to the target SM network element based on the address of the target SM network element.

In an implementation, before the determining, by a mobility management network element, to hand over an SM for UE, and selecting a target SM, the method further includes: receiving, by the mobility management network element, the parameter that is sent by the target base station and that is used to set up the user plane data channel between the target user plane function entity and the target base station and used for downlink transmission.

A third aspect of this application provides a handover method, including: determining, by a source SM network element, to hand over an SM for UE, and selecting a target SM network element; and triggering, by the source SM network element, a process of setting up a channel by the target SM network element, where the channel includes a user plane data channel between a target user plane function entity and a target base station.

A fourth aspect of this application provides an SM network element, including a processor and a communications component. The processor is configured to: determine to hand over an SM for UE, and select a target SM network element. The communications component is configured to trigger a process of setting up a channel by the target SM network element, where the channel includes a user plane data channel between a target user plane function entity and a target base station.

In an implementation, the triggering, by the source SM network element, a process of setting up a channel by the target SM network element includes: sending, by the source SM network element to the target SM network element, a UE ID and information indicating an address of the target base station, where the information indicating the address of the target base station includes the address of the target base station or information to be mapped to the address of the target base station.

In an implementation, before the determining, by a source SM network element, to hand over an SM for UE, and selecting a target SM, the method further includes: receiving, by the source SM network element, a message for triggering SM relocation sent by a source base station.

In an implementation, the message for triggering SM relocation includes the address of the target base station or the information to be mapped to the address of the target base station.

In an implementation, the triggering, by the source SM network element, a process of setting up a channel by the target SM network element includes: sending, by the source SM network element to the target SM network element, a UE ID and information indicating an address of the target base station, where the information indicating the address of the target base station includes the address of the target base station or information to be mapped to the address of the target base station.

In an implementation, before the determining, by a source SM network element, to hand over an SM for UE, and selecting a target SM, the method further includes: sending, by the mobility management network element to the source SM network element, the UE ID and the information indicating the address of the target base station.

In an implementation, the triggering, by the source SM network element, a process of setting up a channel by the target SM network element includes: sending, by the source SM network element, an address of the target SM network element to a mobility management network element; sending, by the mobility management network element, the address of the target SM network element to the target base station; and sending, by the target base station to the target SM network element, a UE ID, an address of a source SM network element, and a parameter used to set up the user plane data channel between the UPF 2 and the target base station and used for downlink transmission.

In an implementation, before the determining, by a source SM network element, to hand over an SM for UE, and selecting a target SM, the method further includes: sending, by the mobility management network element to the source SM network element, the UE ID and information indicating an address of the target base station, where the information indicating the address of the target base station includes the address of the target base station or information to be mapped to the address of the target base station.

In an implementation, the triggering, by the source SM network element, a process of setting up a channel by the target SM includes: sending, by the source SM network element to the target SM network element, a UE ID and a parameter that is used to set up the user plane data channel between the UPF 2 and the target base station and used for downlink transmission.

In an implementation, before the determining, by a source SM network element, to hand over an SM for UE, and selecting a target SM, the method further includes: sending, by the target base station to the source SM network element, the parameter used to set up the user plane data channel between the target user plane function entity and the target base station and used for downlink transmission.

A fifth aspect of this application provides a handover method, including: determining, by a target base station, to hand over an SM for UE, and selecting a target SM network element; and triggering, by the target base station, a process of setting up a channel by the target SM network element, where the channel includes a user plane data channel between a target user plane function entity and a target base station.

A sixth aspect of this application provides a base station, including a processor and a communications component. The processor is configured to: determine to hand over an SM for UE, and select a target SM network element. The communications component is configured to trigger a process of setting up a channel by the target SM network element, where the channel includes a user plane data channel between a target user plane function entity and a target base station.

In an implementation, the triggering, by the target base station, a process of setting up a channel by the target SM network element includes: sending, by the target base station to the target SM network element, a UE ID, an address of a source SM network element, and a parameter used to set up the user plane data channel between the target user plane function entity and the target base station and used for downlink transmission. In an implementation, the process of setting up the channel by the target SM network element includes: exchanging, by the target SM network element with the target base station, a parameter used to set up the user plane data channel between the target user plane function entity and the target base station.

In an implementation, the channel further includes a data channel between a source user plane function entity and the target user plane function entity.

In an implementation, the process of setting up the channel by the target SM network element further includes: exchanging, by the target SM network element with the source SM network element, a parameter used to set up the data channel between the source user plane function entity and the target user plane function entity.

In an implementation, the channel further includes a control plane signaling channel between the target SM network element and the target base station.

In an implementation, the process of setting up the channel by the target SM network element further includes: exchanging, by the target SM network element with the target base station, a parameter used to set up the control plane signaling channel between the target user plane function entity and the target base station.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
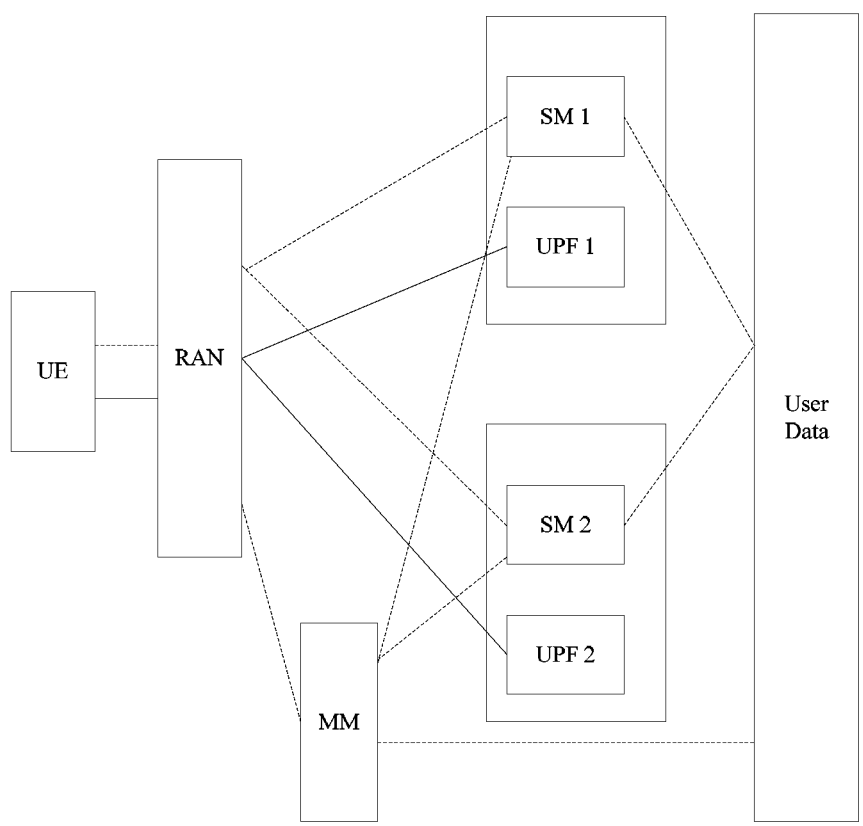
FIG. 1 is a schematic diagram of a communications architecture according to an embodiment of the present invention.

Based on a network architecture shown in FIG. 1, before handover is performed, it is assumed that a source base station is a RAN 1, a source SM network element is an SM 1, and a source UPF entity is a UPF 1. After UE is handed over from the source base station to a target base station (referred to as a RAN 2 below) on a radio access network side, handover needs to be performed on an operator network side. An objective of the handover performed on the operator network side is to set up a data transmission channel between the source UPF entity (referred to as the UPF 1 below) and a target UPF entity (referred to as a UPF 2 below), set up uplink and downlink user plane data channels between the UPF 2 and the RAN 2, and set up uplink and downlink control plane signaling channels between a target SM network element SM 2 and the RAN 2.

With reference to the accompanying drawings, implementation of the foregoing objective is described in detail below.

Figure 2:
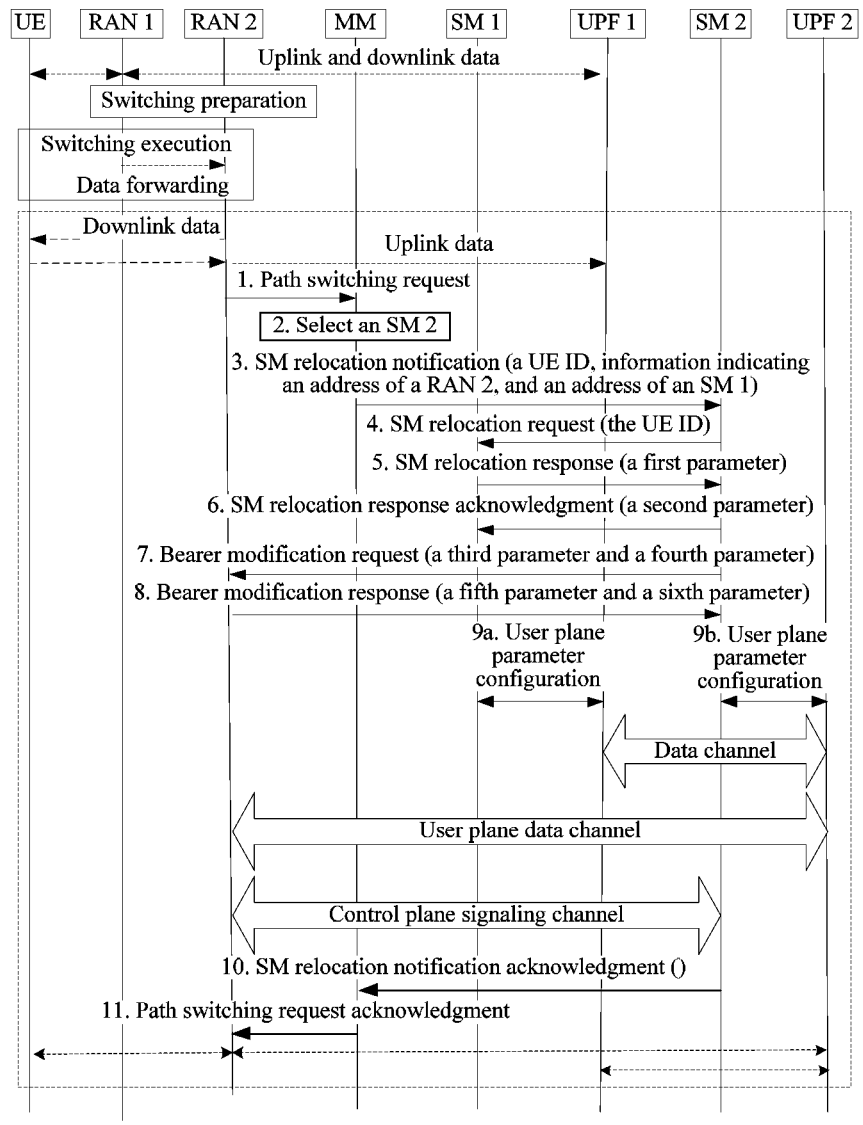
FIG. 2 is a flowchart of a handover method according to an embodiment of the present invention.

FIG. 2 shows a handover method according to an embodiment of this application. The handover method includes the following steps.

1. A RAN 2 sends a path switching request to an MM.

2. The MM (in each of FIG. 2 to FIG. 8, the MM is a target MM) determines that the MM needs to hand over an SM for UE, and selects an SM 2 as a target SM.

3. The MM sends, to the SM 2, a UE ID, information indicating an address of the RAN 2, and an address of an SM 1. Optionally, the UE ID, the information indicating the address of the RAN 2, and the address of the SM 1 may be carried in an SM relocation notification and sent to the SM 2.

In this embodiment and the following embodiments, the information indicating the address of the RAN 2 may be the address of the RAN 2 (for example, an identifier of a base station), or may be information (for example, cell identifier information) to be mapped to the address of the RAN 2.

4. The SM 2 sends the UE ID to the SM 1 based on the address of the SM 1. Optionally, the UE ID may be carried in an SM relocation request and sent to the SM 1.

5. The SM 1 sends a first parameter to the SM 2. Optionally, the first parameter may be carried in an SM relocation response and sent to the SM 2.

The first parameter is used to set up a data transmission channel between a UPF 2 and a UPF 1 for the UE, so that the UPF 1 can identify specific UE to which data sent by the UPF 2 belongs.

Optionally, the SM 1 further sends a bearer context related parameter of the UE to the SM 2.

6. The SM 2 sends a second parameter to the SM 1. Optionally, the second parameter may be carried in an SM relocation response acknowledgment and sent to the SM 1.

The second parameter is used to set up the data transmission channel between the UPF 2 and the UPF 1 for the UE, so that the UPF 2 can identify data sent by the UPF 1.

Optionally, the second parameter may be carried in the SM relocation request in step 4 and sent to the SM 2. In this case, step 6 is not required.

7. The SM 2 sends a third parameter and a fourth parameter to the RAN 2 based on the information indicating the address of the RAN 2. The third parameter and the fourth parameter may be carried in a bearer modification request and sent to the RAN 2. The third parameter and the fourth parameter may be carried in one message and sent to the RAN 2, or may be carried in two messages and sent to the RAN 2.

The third parameter is used to set up a data transmission channel between the UPF 2 and the RAN 2 for the UE and is used when the RAN 2 sends uplink user plane data to the SM 2, so that the UPF 2 can identify the uplink user plane data sent by the RAN 2.

The fourth parameter is used to set up a signaling transmission channel between the RAN 2 and the SM 2 for the UE and is used when the RAN 2 sends uplink control plane signaling to the SM 2, so that the SM 2 can identify the uplink control plane signaling sent by the RAN 2.

8. The RAN 2 sends a fifth parameter and a sixth parameter to the SM 2. The fifth parameter and the sixth parameter may be carried in a bearer modification response and sent to the SM 2.

The fifth parameter is used when the UPF 2 sends downlink user plane data to the RAN 2, so that the RAN 2 can identify the downlink user plane data sent by the UPF 2.

The sixth parameter is used to set up a signaling transmission channel between the RAN 2 and the SM 2 for the UE and is used when the SM 2 sends downlink control plane signaling to the RAN 2, so that the RAN 2 can identify the downlink control plane signaling sent by the SM 2.

9a. The SM 1 performs user plane parameter configuration on the UPF 1. That the SM 1 performs user plane parameter configuration on the UPF 1 may include: the SM 1 sends the first parameter and the second parameter to the UPF 1.

9b. The SM 2 performs user plane parameter configuration on the UPF 2. That the SM 2 performs user plane parameter configuration on the UPF 2 may include: the SM 2 sends the first parameter, the second parameter, the third parameter, and the fifth parameter to the UPF 2.

Optionally, an SM may send a parameter to a corresponding UPF by updating content configurations. Optionally, the SM 1 may send the first parameter and the second parameter to the UPF 1 after step 6. It is not limited that the SM 1 sends the first parameter and the second parameter to the UPF 1 after step 7 or step 8.

In this way, a data channel between the UPF 1 and the UPF 2 is already set up. Uplink and downlink user plane data channels between the UPF 2 and the RAN 2 are already set up. Uplink and downlink control plane signaling channels between the SM 2 and the RAN 2 are already set up.

Optionally, FIG. 2 may further include the following steps:

10. The SM 2 sends an SM relocation notification acknowledgment to the MM.

Optionally, the third parameter and the fourth parameter in step 7 may be sent to the RAN 2 in step 10. In this case, step 7 is not required.

11. The MM sends a path switching request acknowledgment to the RAN 2. Optionally, this step may be performed after step 1.

It should be noted that an execution sequence of step 3 to step 8 in FIG. 2 is not limited.

It should be noted that in this embodiment and subsequent embodiments, the third parameter, the fourth parameter, the fifth parameter, and the sixth parameter may be forwarded by other core network nodes, for example, an MM and/or a message forwarding entity, and the message forwarding entity may be a NAS agent node.

It may be learned from FIG. 2 that, according to the handover method in this embodiment, handover between an SM and a UPF can be implemented based on the architecture in FIG. 1.

It should be noted that optionally, the messages in step 7 and step 8 may be routed by the target mobility management network element, namely, the target MM (if all signaling of the RAN and a core network CN is routed by the MM), or may be directly transferred by using an interface between the RAN and the SM (if there is a direct interface between the RAN and the SM).

Figure 3:
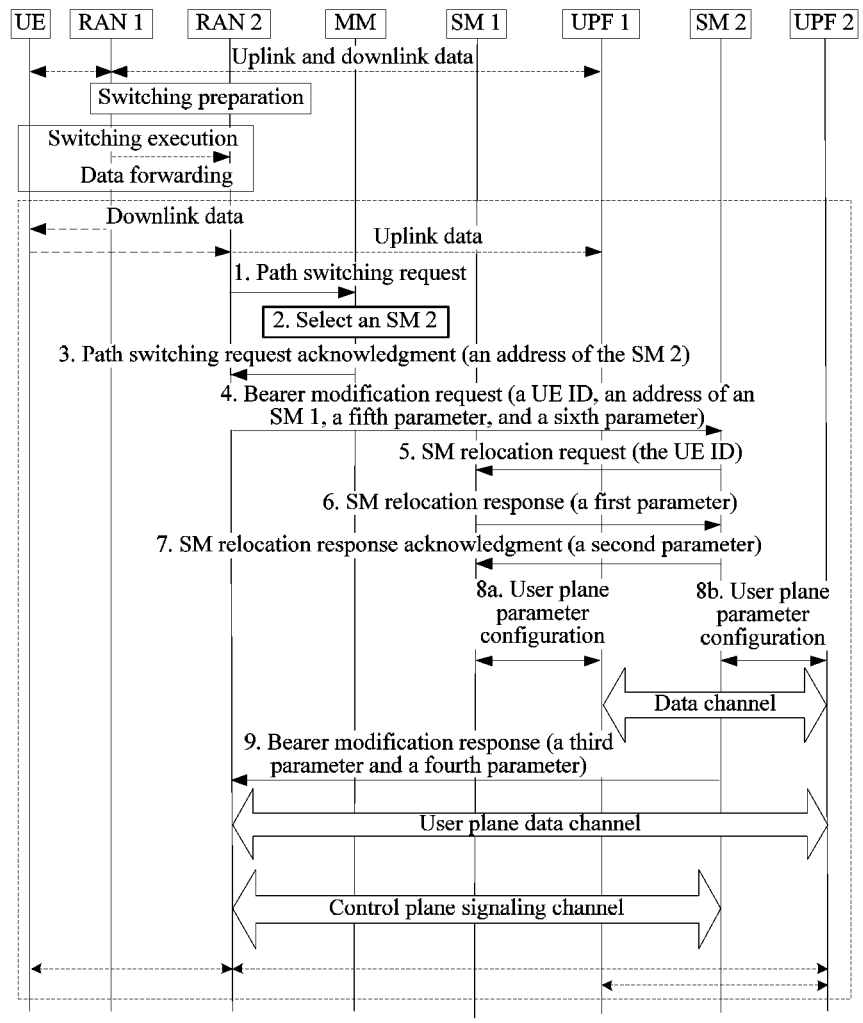
FIG. 3 is a flowchart of another handover method according to an embodiment of the present invention.

FIG. 3 shows another handover method according to an embodiment of this application. The handover method includes the following steps.

1. A RAN 2 sends a path switching request to an MM.
2. The MM determines that the MM needs to hand over an SM for UE, and selects an SM 2 as a target SM.
3. The MM sends an address of the SM 2 to the RAN 2. Optionally, the address of the SM 2 may be carried in a path switching request acknowledgment and sent to the RAN 2.
4. The RAN 2 sends a UE ID, an address of an SM 1, a fifth parameter, and a sixth parameter to the SM 2 based on the address of the SM 2. Optionally, the UE ID, the address of the SM 1, the fifth parameter, and the sixth parameter may be carried in a bearer modification request and sent to the SM 2.

5. The SM 2 sends an SM relocation request carrying the UE ID to the SM 1 based on the address of the SM 1.
6. The SM 1 sends a first parameter to the SM 2. Optionally, the first parameter may be carried in an SM relocation response and sent to the SM 2.

Optionally, the SM 1 further sends a bearer context related parameter of the UE to the SM 2.

7. The SM 2 sends a second parameter to the SM 1. Optionally, the second parameter may be carried in an SM relocation response acknowledgment and sent to the SM 1. Optionally, the second parameter may be carried in the SM relocation request in step 5 and sent to the SM 1. In this case, step 7 is not required.

8a. The SM 1 performs user plane parameter configuration on a UPF 1. This step may include: the SM 1 sends the first parameter and the second parameter to the UPF 1.

8b. The SM 2 performs user plane parameter configuration on a UPF 2. This step may include: the SM 2 sends the first parameter, the second parameter, a third parameter, and the fifth parameter to the UPF 2.

9. The SM 2 sends the third parameter and a fourth parameter to the RAN 2. The fifth parameter and the sixth parameter may be carried in a bearer modification response and sent to the RAN 2.

It should be noted that optionally, the messages in step 4 and step 9 may be routed by the target MM (if all signaling of the RAN and a core network CN is routed by the MM), or may be directly transferred by using an interface between the RAN and the SM (if there is a direct interface between the RAN and the SM).

Figure 4:
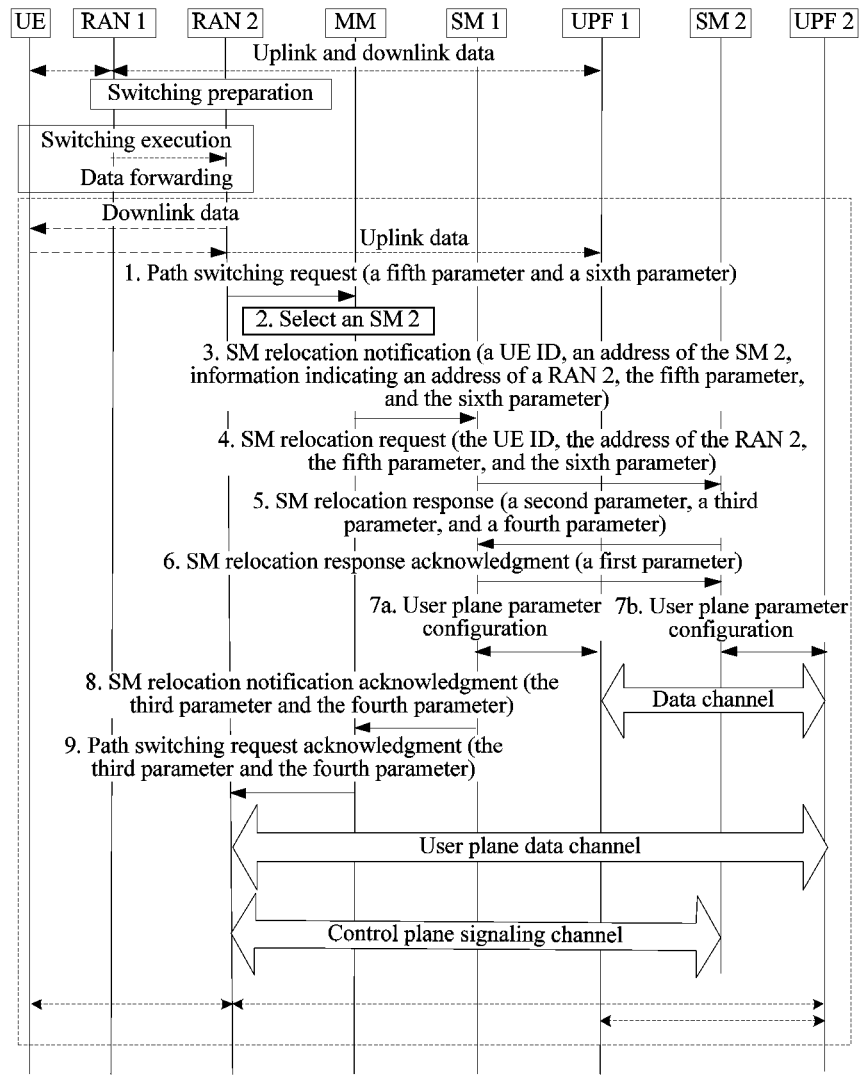
FIG. 4 is a flowchart of another handover method according to an embodiment of the present invention.

FIG. 4 shows another handover method according to an embodiment of this application. The handover method includes the following steps.

1. A RAN 2 sends a fifth parameter and a sixth parameter to an MM. The fifth parameter and the sixth parameter may be carried in a path switching request and sent to the MM.
2. The MM determines that the MM needs to hand over an SM for UE, and selects an SM 2 as a target SM.
3. The MM sends a UE ID, the fifth parameter, the sixth parameter, information indicating an address of the RAN 2, and an address of the SM 2 to an SM 1. The UE ID, the fifth parameter, the sixth parameter, the information indicating the address of the RAN 2, and the address of the SM 2 may be carried in an SM relocation notification and sent to the SM 1.
4. The SM 1 sends the UE ID, the information indicating the address of the RAN 2, the fifth parameter, and the sixth parameter to the SM 2. The UE ID, the information indicating the address of the RAN 2, the fifth parameter, and the sixth parameter may be carried in an SM relocation request and sent to the SM 2.

Optionally, the SM 1 further sends a bearer context related parameter of the UE to the SM 2.

5. The SM 2 sends a second parameter, a third parameter, and a fourth parameter to the SM 1. The second parameter, the third parameter, and the fourth parameter may be carried in an SM relocation response and sent to the SM 1.
6. The SM 1 sends a first parameter to the SM 2. The first parameter may be carried in an SM relocation response acknowledgment and sent to the SM 2. Optionally, the first parameter may be sent to the SM 2 in step 4. In this case, step 6 is not required.

7a. The SM 1 performs user plane parameter configuration on a UPF 1.

7b. The SM 2 performs user plane parameter configuration on a UPF 2.

8. The SM 1 sends the third parameter and the fourth parameter to the MM. The third parameter and the fourth parameter may be carried in an SM relocation notification acknowledgment and sent to the MM. Optionally, step 8 may be performed after step 5, and a sequence of step 6, step 7a, or step 7b and step 8 is not limited.

9. The MM sends the third parameter and the fourth parameter to the RAN 2. The third parameter may be carried in a path switching request acknowledgment and sent to the RAN 2.

Figure 5:
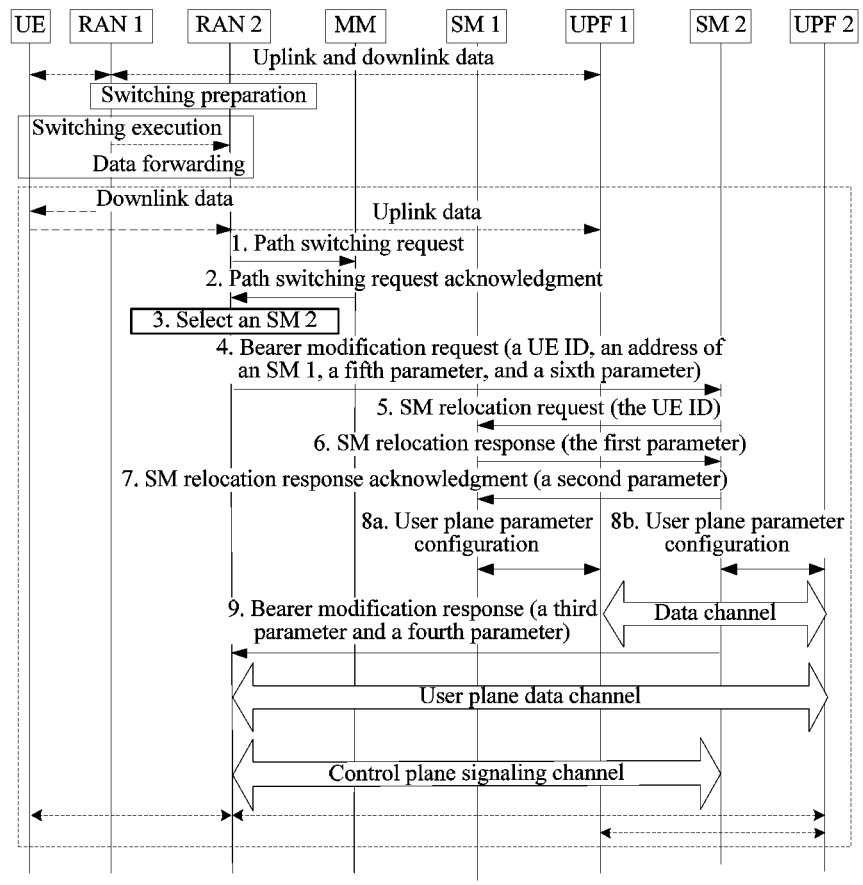
FIG. 5 is a flowchart of another handover method according to an embodiment of the present invention.

FIG. 5 shows another handover method according to an embodiment of this application. The handover method includes the following steps.

1. A RAN 2 sends a path switching request to an MM.
2. The MM sends a path switching request acknowledgment to the RAN 2.
3. The RAN 2 determines that the RAN 2 needs to hand over an SM for UE, and selects an SM 2 as a target SM.
4. The RAN 2 sends a UE ID, an address of an SM 1, a fifth parameter, and a sixth parameter to the SM 2. The UE ID, the address of the SM 1, the fifth parameter, and the sixth parameter may be carried in a bearer modification request and sent to the SM 2.
5. The SM 2 sends the UE ID to the SM 1 based on the address of the SM 1. Optionally, the UE ID may be carried in an SM relocation request and sent to the SM 1.
6. The SM 1 sends a first parameter to the SM 2. Optionally, the first parameter may be carried in an SM relocation response and sent to the SM 2.

Optionally, the SM 1 further sends a bearer context related parameter of the UE to the SM 2.

7. The SM 2 sends a second parameter to the SM 1. Optionally, the second parameter may be carried in an SM relocation response acknowledgment and sent to the SM 1. Optionally, the second parameter may be sent to the SM 1 in step 5. In this case, step 7 is not required.
8a. The SM 1 performs user plane parameter configuration on a UPF 1.
8b. The SM 2 performs user plane parameter configuration on a UPF 2. Optionally, step 8b may be performed after step 6. It is not limited that step 8b is performed after step 7.
9. The SM 2 sends a third parameter and a fourth parameter to the RAN 2. The third parameter and the fourth parameter may be carried in a bearer modification response and sent to the RAN 2.

It should be noted that an execution sequence of step 1 and step 2 and step 3 to step 9 is not limited.

It should be noted that optionally, the messages in step 4 and step 9 may be routed by the target MM (if all signaling of the RAN and a core network CN is routed by the MM), or may be directly transferred by using an interface between the RAN and the SM (if there is a direct interface between the RAN and the SM).

It should be noted that optionally, step 9 may alternatively be performed after step 4 and before step 5.

Figure 6:
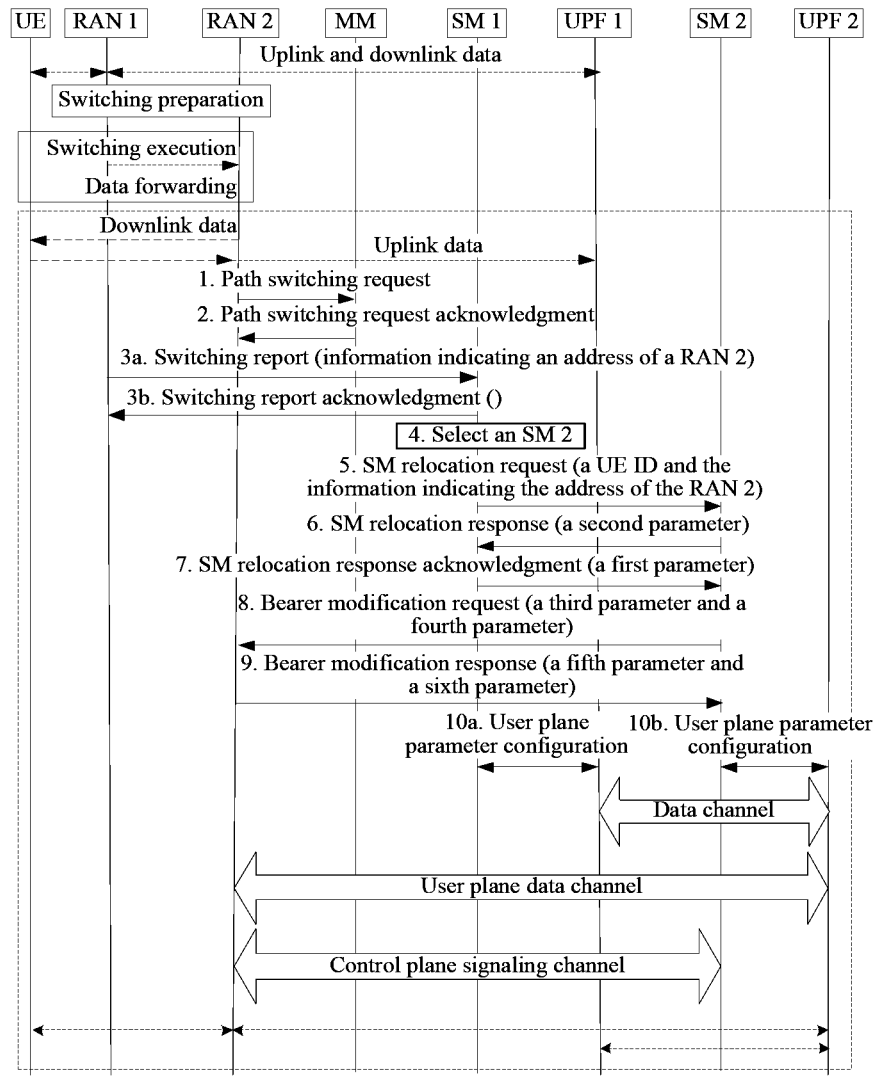
FIG. 6 is a flowchart of another handover method according to an embodiment of the present invention.

FIG. 6 shows another handover method according to an embodiment of this application. The handover method includes the following steps:

1. A RAN 2 sends a path switching request to an MM.
2. The MM sends a path switching request acknowledgment to the RAN 2.
3a. A RAN 1 sends, to an SM 1, information indicating an address of the RAN 2. Optionally, the information indicating the address of the RAN 2 may be carried in a switching report and sent to the SM 1.
3b. The SM 1 sends a switching report acknowledgment to the RAN 1.
4. The SM 1 determines that the SM 1 needs to hand over an SM for UE, and selects an SM 2 as a target SM.
5. The SM 1 sends, to the SM 2, a UE ID and the information indicating the address of the RAN 2. The UE ID and the information indicating the address of the RAN 2 may be carried in an SM relocation request and sent to the SM 2.
6. The SM 2 sends a second parameter to the SM 1. The second parameter may be carried in an SM relocation response and sent to the SM 1.
7. The SM 1 sends a first parameter to the SM 2. The first parameter may be carried in an SM relocation response acknowledgment and sent to the SM 2. Optionally, the first parameter may be sent to the SM 2 in step 5. In this case, step 7 is not required.
8. The SM 2 sends a third parameter and a fourth parameter to the RAN 2 based on the information indicating the address of the RAN 2. The third parameter and the fourth parameter may be carried in a bearer modification request and sent to the RAN 2.
9. The RAN 2 sends a fifth parameter and a sixth parameter to the SM 2. The fifth parameter and the sixth parameter may be carried in a bearer modification response and sent to the SM 2.
10a. The SM 1 performs user plane parameter configuration on a UPF 1.
10b. The SM 2 performs user plane parameter configuration on a UPF 2.

In this way, uplink and downlink user plane data channels between the UPF 2 and the RAN 2 are already set up. Uplink and downlink control plane signaling channels between the SM 2 and the RAN 2 are already set up. A data channel between the UPF 1 and the UPF 2 is already set up.

It should be noted that optionally, the SM 1 may send a bearer context related parameter of the UE to the SM 2 in step 5 or step 7.

It should be noted that optionally, the messages in step 8 and step 9 may be routed by the target MM (if all signaling of the RAN and a core network CN is routed by the MM), or may be directly transferred by using an interface between the RAN and the SM (if there is a direct interface between the RAN and the SM). The messages in step 3a and step 3b may be routed by the source MM (if all signaling of the RAN and the core network CN is routed by the MM), or may be directly transferred by using an interface between the RAN and the SM (if there is a direct interface between the RAN and the SM).

It should be noted that optionally, step 3b may be omitted; or if there is step 3b, step 3b may be performed after step 5 to step 7, step 8, and step 9 are performed.

It should be noted that optionally, step 8 and step 9 may be performed after step 5 and before step 6.

It should be noted that an execution sequence of step 1 and step 2 and step 3 to step 9 is not limited.

Figure 7A:
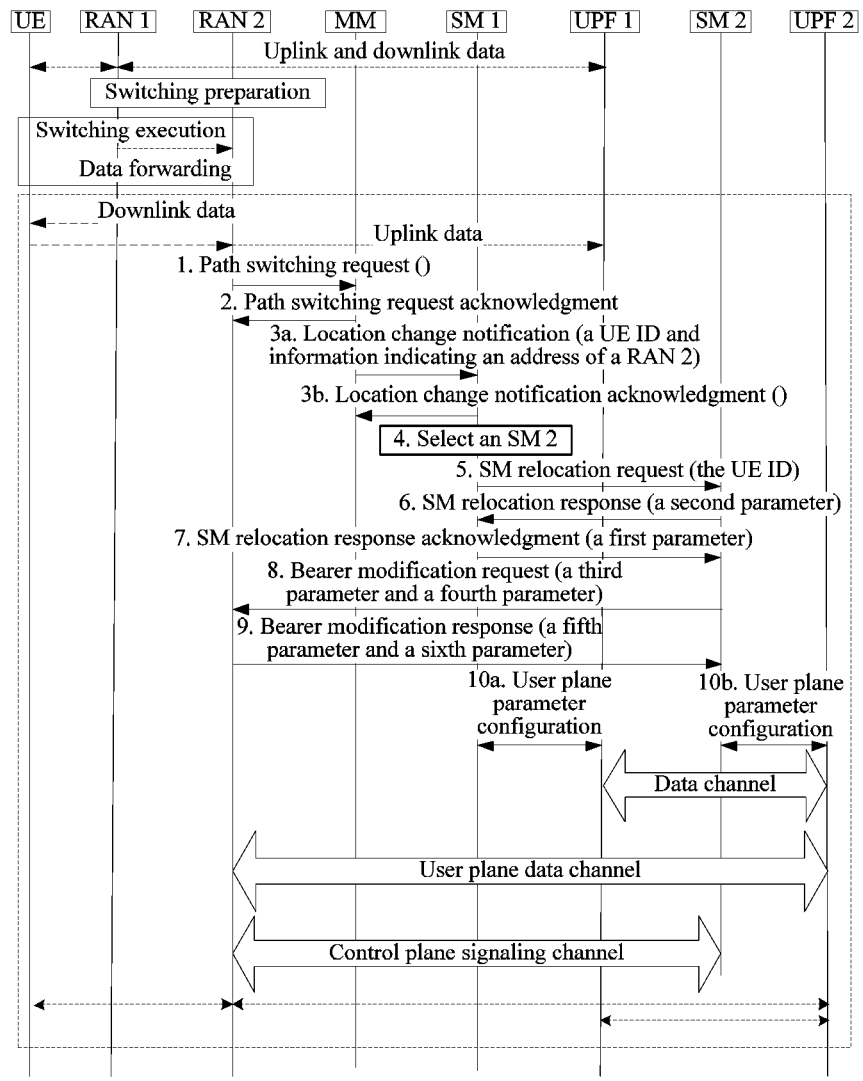
FIG. 7a is a flowchart of another handover method according to an embodiment of the present invention.

FIG. 7a shows another handover method according to an embodiment of this application. The handover method includes the following steps:

1. A RAN 2 sends a path switching request to an MM. Optionally, the path switching request may further carry information indicating an address of the RAN 2.
2. The MM sends a path switching request acknowledgment to the RAN 2.
3a. The MM sends, to an SM 1, a UE ID and the information indicating the address of the RAN 2. The UE ID and the information indicating the address of the RAN 2 may be carried in a location change notification and sent to the SM 1.

3b. The SM 1 sends a location change notification acknowledgment to the MM.

4. The SM 1 determines that the SM 1 needs to hand over an SM for UE, and selects an SM 2 as a target SM.

5. The SM 1 sends the UE ID to the SM 2. The UE ID may be carried in an SM relocation request and sent to the SM 2. Optionally, in this step, the information indicating the address of the RAN 2 may further be sent to the SM 2. Alternatively, the information indicating the address of the RAN 2 may be subsequently sent to the SM 2, provided that the information indicating the address of the RAN 2 is sent to the SM 2 before step 8.

6. The SM 2 sends a second parameter to the SM 1. Optionally, the second parameter may be carried in an SM relocation response and sent to the SM 1.

7. The SM 1 sends a first parameter to the SM 2. Optionally, the first parameter may be carried in an SM relocation response acknowledgment and sent to the SM 2. Optionally, the first parameter may be sent to the SM 2 in step 5. In this case, step 7 is not required.

8. The SM 2 sends a third parameter and a fourth parameter to the RAN 2. Optionally, the third parameter and the fourth parameter may be carried in a bearer modification request and sent to the RAN 2.

9. The RAN 2 sends a fifth parameter and a sixth parameter to the SM 2. Optionally, the fifth parameter and the sixth parameter may be carried in a bearer modification response and sent to the SM 2.

10a. The SM 1 performs user plane parameter configuration on a UPF 1.

10b. The SM 2 performs user plane parameter configuration on a UPF 2.

It should be noted that optionally, the messages in step 8 and step 9 may be routed by the target MM (if all signaling of the RAN and a core network CN is routed by the MM), or may be directly transferred by using an interface between the RAN and the SM (if there is a direct interface between the RAN and the SM).

It should be noted that optionally, step 3b may be omitted; or if there is step 3b, step 3b may be performed after step 5 to step 7, step 8, and step 9 are performed.

It should be noted that optionally, step 2 may be performed after the target MM receives the message in step 3b.

It should be noted that optionally, step 8 and step 9 may be performed after step 5 and before step 6.

In addition, optionally, in step 5 or step 7, a bearer context parameter of the UE may further be included.

It should be noted that an execution sequence of step 1 and step 2 and step 3 to step 9 is not limited.

Figure 7B:
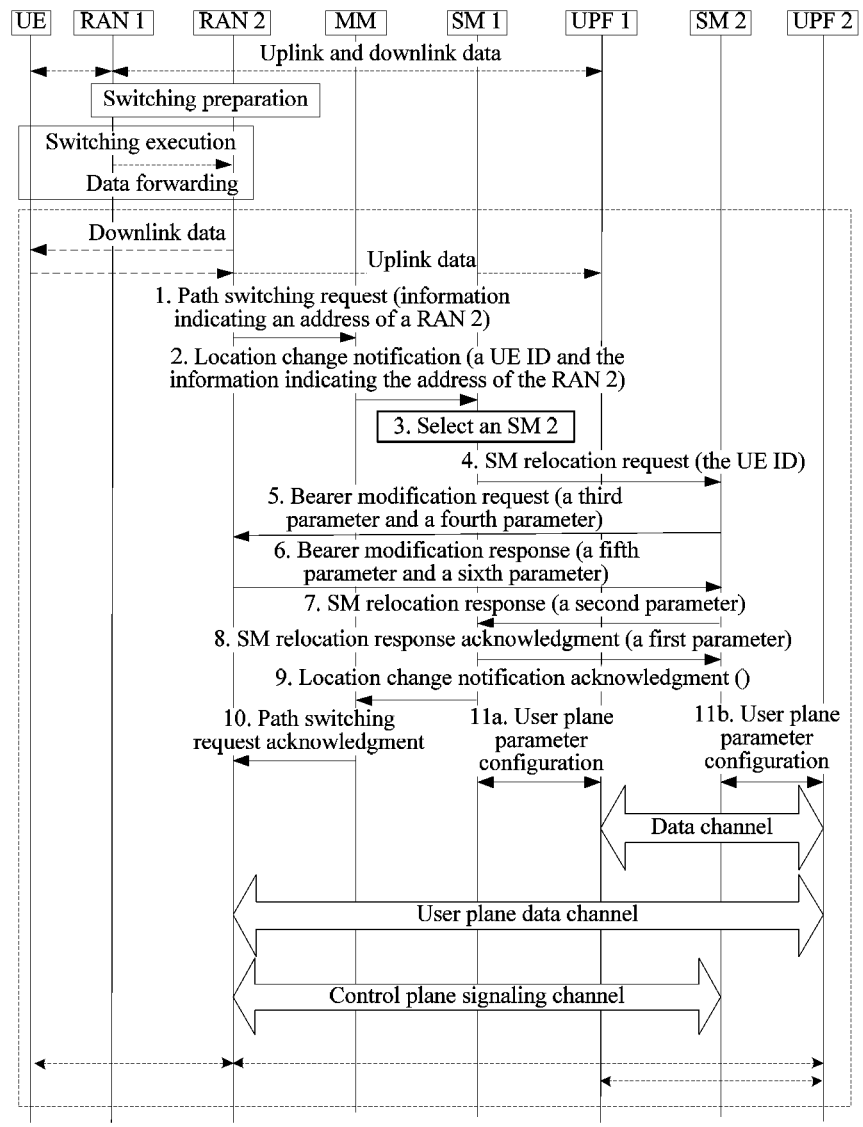
FIG. 7b is a flowchart of another handover method according to an embodiment of the present invention.

FIG. 7*b* shows another handover method according to an embodiment of this application. The handover method includes the following steps:

1. A RAN 2 sends a path switching request to an MM. Optionally, the path switching request may further carry information indicating an address of the RAN 2.

2. The MM sends, to an SM 1, a UE ID and the information indicating the address of the RAN 2. The UE ID and the information indicating the address of the RAN 2 may be carried in a location change notification and sent to the SM 1.

3. The SM 1 determines that the SM 1 needs to hand over an SM for UE, and selects an SM 2 as a target SM.

4. The SM 1 sends the UE ID to the SM 2. The UE ID may be carried in an SM relocation request and sent to the SM 2. Optionally, in this step, the information indicating the address of the RAN 2 may be sent to the SM 2.

5. The SM 2 sends a third parameter and a fourth parameter to the RAN 2. Optionally, the third parameter and the fourth parameter may be carried in a bearer modification request and sent to the RAN 2.

6. The RAN 2 sends a fifth parameter and a sixth parameter to the SM 2. Optionally, the fifth parameter and the sixth parameter may be carried in a bearer modification response and sent to the SM 2.

7. The SM 2 sends a second parameter to the SM 1. Optionally, the second parameter may be carried in an SM relocation response and sent to the SM 1.

8. The SM 1 sends a first parameter to the SM 2. Optionally, the first parameter may be carried in an SM relocation response acknowledgment and sent to the SM 2. Optionally, the first parameter may be sent to the SM 2 in step 4. In this case, step 8 is not required.

9. The SM 1 sends a location change notification acknowledgment to the MM.

10. The MM sends a path switching request acknowledgment to the RAN 2.

11a. The SM 1 performs user plane parameter configuration on a UPF 1.

11b. The SM 2 performs user plane parameter configuration on a UPF 2.

It should be noted that optionally, the messages in step 5 and step 6 may be routed by the target MM (if all signaling of the RAN and a core network CN is routed by the MM), or may be directly transferred by using an interface between the RAN and the SM (if there is a direct interface between the RAN and the SM).

Figure 8:
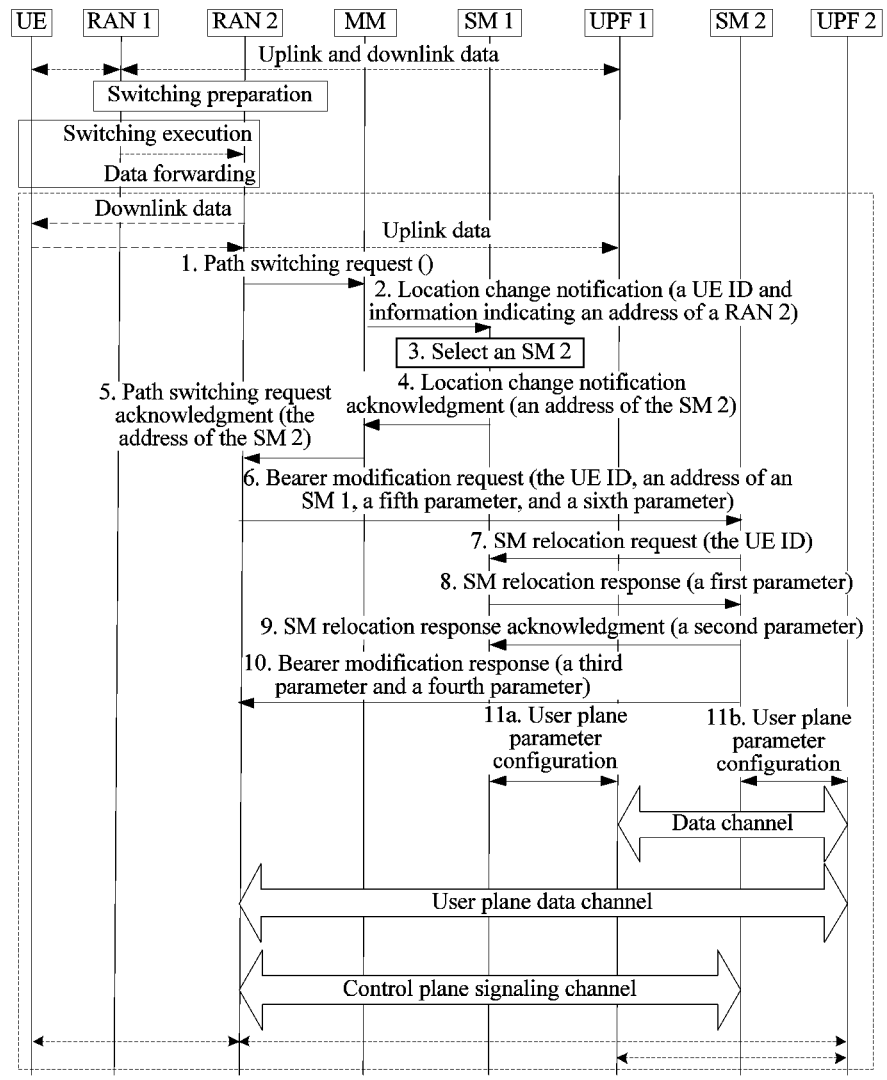
FIG. 8 is a flowchart of another handover method according to an embodiment of the present invention.

FIG. 8 shows another handover method according to an embodiment of this application. The handover method includes the following steps:

1. A RAN 2 sends a path switching request to an MM. Optionally, the path switching request may carry information indicating an address of the RAN 2.

2. The MM sends, to an SM 1, a UE ID and the information indicating the address of the RAN 2. Optionally, the information indicating the address of the RAN 2 may be carried in a location change notification and sent to the SM 1.

3. The SM 1 determines that the SM 1 needs to hand over an SM for UE, and selects an SM 2 as a target SM.

4. The SM 1 sends an address of the SM 2 to the MM. Optionally, the address of the SM 2 may be carried in a location change notification acknowledgment and sent to the MM.

5. The MM sends the address of the SM 2 to the RAN 2. Optionally, the address of the SM 2 may be carried in a path switching request acknowledgment and sent to the RAN 2.

6. The RAN 2 sends the UE ID, an address of the SM 1, a fifth parameter, and a sixth parameter to the SM 2. Optionally, the UE ID, the address of the SM 1, the fifth parameter, and the sixth parameter may be carried in a bearer modification request and sent to the SM 2.

7. The SM 2 sends the UE ID to the SM 1. Optionally, the UE ID may be carried in an SM relocation request and sent to the SM 1.

8. The SM 1 sends a first parameter to the SM 2. Optionally, the first parameter may be carried in an SM relocation response and sent to the SM 2.

9. The SM 2 sends a second parameter to the SM 1. Optionally, the second parameter may be carried in an SM relocation response acknowledgment and sent to the SM 1.

Optionally, the second parameter may be sent to the SM 1 in step 7. In this case, step 9 is not required.

10. The SM 2 sends a third parameter and a fourth parameter to the RAN 2. Optionally, the third parameter and the fourth parameter may be carried in a bearer modification response and sent to the RAN 2.

11a. The SM 1 performs user plane parameter configuration on a UPF 1.

11b. The SM 2 performs user plane parameter configuration on a UPF 2.

It should be noted that optionally, the messages in step 6 and step 10 may be routed by the target MM (if all signaling of the RAN and a core network CN is routed by the MM), or may be directly transferred by using an interface between the RAN and the SM (if there is a direct interface between the RAN and the SM).

In addition, optionally, in step 8, a bearer context related parameter of the UE may further be included.

Figure 9:
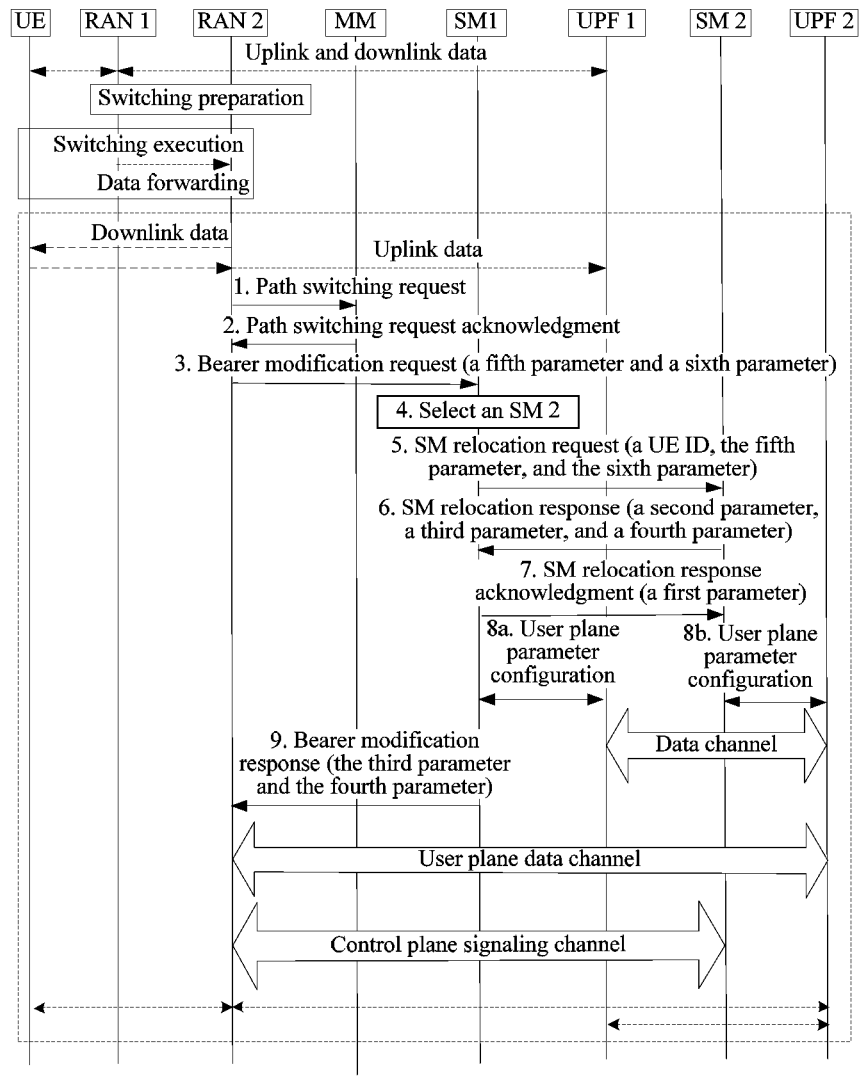
FIG. 9 is a flowchart of another handover method according to an embodiment of the present invention.

FIG. 9 shows another handover method according to an embodiment of this application. The handover method includes the following steps:

1. A RAN 2 sends a path switching request to an MM.
2. The MM sends a path switching request acknowledgment to the RAN 2.
3. The RAN 2 sends a fifth parameter and a sixth parameter to an SM 1. Optionally, the fifth parameter and the sixth parameter may be carried in a bearer modification request and sent to the SM 1.
4. The SM 1 determines that the SM 1 needs to hand over an SM for UE, and selects an SM 2 as a target SM.
5. The SM 1 sends a UE ID, the fifth parameter, and the sixth parameter to the SM 2. Optionally, the UE ID, the fifth parameter, and the sixth parameter may be carried in an SM relocation request and sent to the SM 2.
6. The SM 2 sends a second parameter, a third parameter, and a fourth parameter to the SM 1. Optionally, the second parameter, the third parameter, and the fourth parameter may be carried in an SM relocation response and sent to the SM 1.
7. The SM 1 sends a first parameter to the SM 2. The first parameter may be carried in an SM relocation response acknowledgment and sent to the SM 2. Optionally, the first parameter may be sent to the SM 2 in step 5. In this case, step 7 is not required.

8a. The SM 1 performs user plane parameter configuration on a UPF 1.

8b. The SM 2 performs user plane parameter configuration on a UPF 2.

9. The SM 1 sends the third parameter and the fourth parameter to the RAN 2. The third parameter and the fourth parameter may be carried in a bearer modification response and sent to the RAN 2.

It should be noted that optionally, the messages in step 3 and step 9 may be routed by the source MM or the target MM (if all signaling of the RAN and a core network CN is routed by the MM), or may be directly transferred by using an interface between the RAN and the SM (if there is a direct interface between the RAN and the SM).

In addition, optionally, in step 5 or step 7, a bearer context related parameter of the UE may further be included.

FIG. 2 to FIG. 9 are merely examples for description, different embodiments may be mutually referenced, and details are not described herein again.

It should be noted that in the foregoing embodiments, the source SM and the target SM may be a same SM function entity. That is, regardless of the MM, the SM, or the RAN 2, when selecting the target SM, the MM, the SM, or the RAN 2 may select the source SM as the target SM.

In this case, the source SM and the target SM may be a same SM function entity, but a control plane signaling channel between the target RAN 2 and the SM still needs to be set up.

In this case, the UPF 1 and the UPF 2 may be the same, and accordingly UE data channel information in the UPF needs to be updated. In other words, similar to the foregoing embodiments, the UPF needs to update and set up a user plane data channel to the RAN 2. A parameter used to set up the user plane data channel is negotiated by the RAN and the SM.

The UPF 1 and the UPF 2 may not be the same. In other words, the SM controls a plurality of UPFs. Although the source SM and the target SM are the same, different UPFs may be selected. In this case, a data channel between the UPF 1 and the UPF 2 still needs to be set up.

The foregoing describes handover by using an X2 interface between base stations. The embodiments of this application further disclose handover by using an S1 interface between an eNB and an MME. Upon comparison, X2 handover differs from S1 handover in a procedure that an MM participates in. To be specific, a procedure that an SM participates in is embedded in a procedure that the MM participates in. The procedure that the SM participates in is the same as that during the X2 handover, and details are not described herein again. For details, refer to FIG. 10 to FIG. 25.

Figure 10:
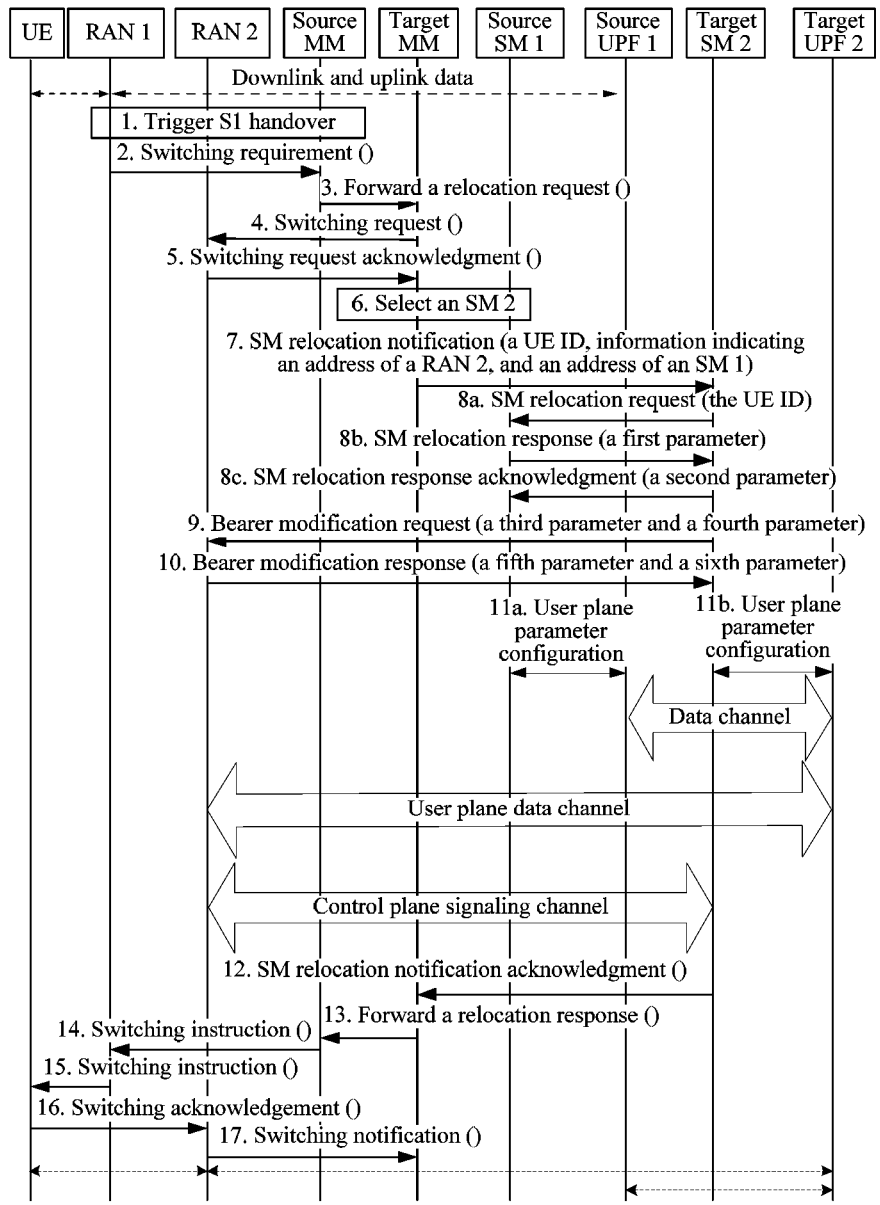
FIG. 10 is a flowchart of another handover method according to an embodiment of the present invention.

In FIG. 10, after selecting the target SM 2, the target MM performs step 7 to trigger the SM 2 and the SM 1 to set up a data channel between the UPF 1 and the UPF 2, and trigger the SM 2 and the RAN 2 to update and set up a bearer between the RAN 2 and the UPF 2. After the target MM receives a switching request acknowledgment in step 5, it may be considered that the RAN 2 successfully allocates an air interface radio resource to the UE, and after the target MM receives an SM relocation notification acknowledgment in step 12, it means that the bearer is successfully updated. In this case, the target MM may consider that the RAN 2 successfully allocates the air interface radio resource to the UE and successfully updates and sets up the bearer, to continue to trigger subsequent steps.

It should be noted that optionally, step 5 may be performed after step 10.

It should be noted that, messages in step 9 and step 10 may be routed by the target MM (if all signaling of the RAN and a core network CN is routed by the MM), or may be directly transferred by using an interface between the RAN and the SM (if there is a direct interface between the RAN and the SM).

In addition, in step 8b, a bearer context parameter of the UE may further be included.

Figure 11:
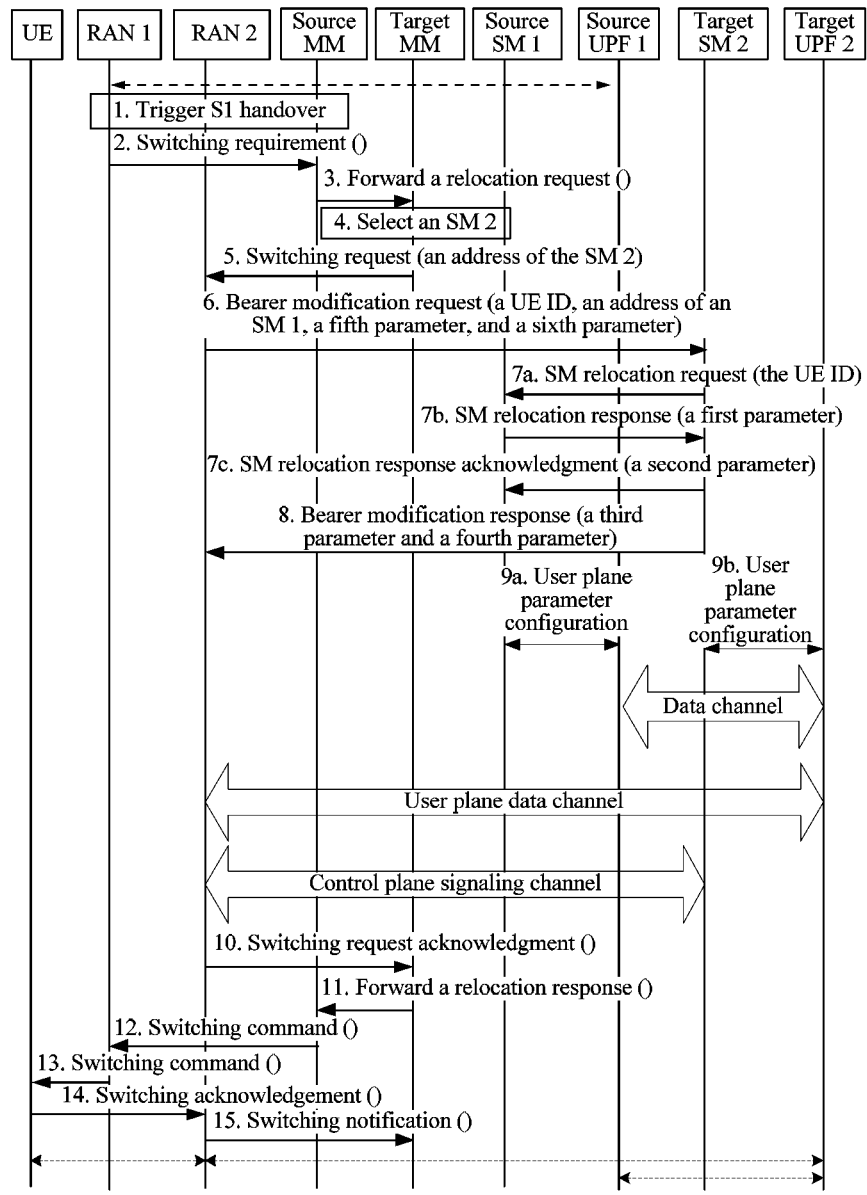
FIG. 11 is a flowchart of another handover method according to an embodiment of the present invention.

In FIG. 11, the target MM selects the target SM 2, and notifies the RAN 2 of an address of the SM 2 by using a switching request. The RAN 2 and the SM 2 initiate a bearer update and setup process. After the RAN 2 receives a bearer modification response in step 8, it means that a bearer is successfully updated. In this case, the RAN 2 sends a switching request acknowledgment to the target MM, and the target MM may consider that the RAN 2 successfully allocates an air interface radio resource to the UE and successfully updates the bearer, to continue to trigger subsequent steps.

It should be noted that, messages in step 6 and step 8 may be routed by the target MM (if all signaling of the RAN and a core network CN is routed by the MM), or may be directly transferred by using an interface between the RAN and the SM (if there is a direct interface between the RAN and the SM).

In addition, in step 7b, a bearer context parameter of the UE may further be included.

Figure 12:
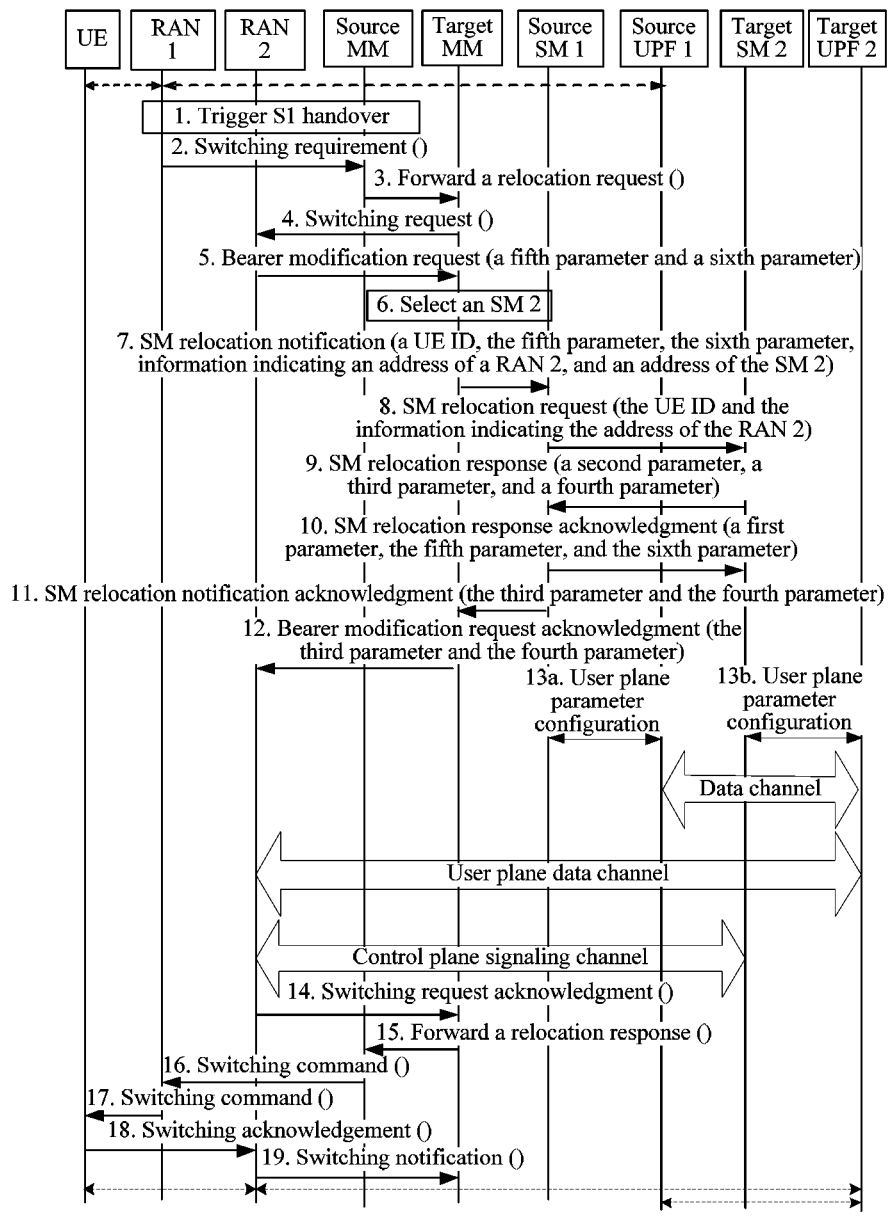
FIG. 12 is a flowchart of another handover method according to an embodiment of the present invention.

In FIG. 12, after the target MM selects the SM 2 and receives a switching request of the target MM, the RAN 2 and the SM 2 initiate a bearer update and setup process by using the MM and the SM 1. After the RAN 2 receives a bearer modification request acknowledgment in step 12, it means that a bearer is successfully updated. In this case, the RAN 2 returns a switching request acknowledgment to the target MM. After receiving a switching request acknowledgment in step 14, the target MM may consider that the RAN 2 successfully allocates an air interface radio resource to the UE and successfully updates the bearer, to continue to trigger subsequent steps.

It should be noted that optionally, step 6 may be performed after step 3 and before step 4, and an address of the SM 2 is carried in step 4.

In addition, optionally, in step 8 or step 10, a bearer context parameter of the UE may further be included.

Figure 13:
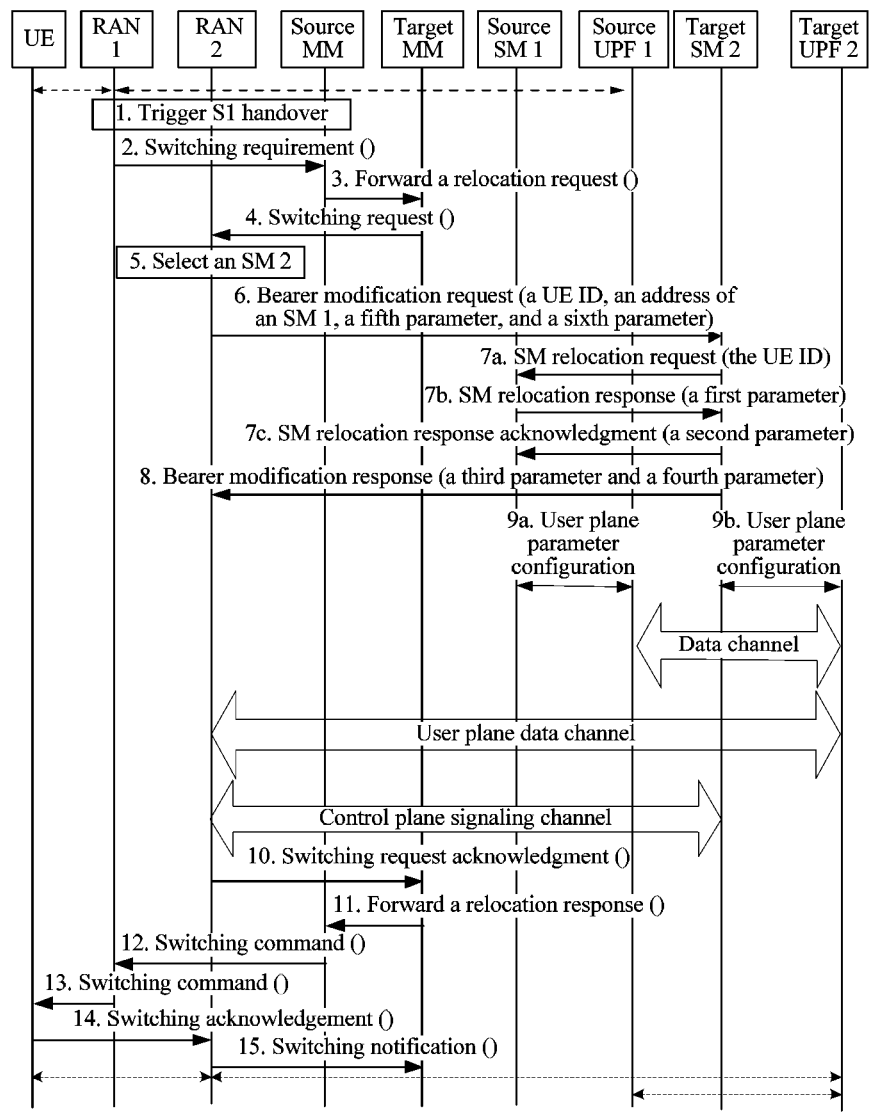
FIG. 13 is a flowchart of another handover method according to an embodiment of the present invention.

In FIG. 13, after receiving a switching request and selecting the SM 2, the RAN 2 and the SM 2 initiate a bearer update and setup process. After the RAN 2 receives step 8, it means that a bearer is successfully updated. When the RAN 2 sends a switching request acknowledgment to the target MM, the target MM may consider that the RAN 2 successfully allocates an air interface radio resource to the UE and successfully updates the bearer, to continue to trigger subsequent steps.

It should be noted that optionally, messages in step 6 and step 8 may be routed by the target MM (if all signaling of the RAN and a core network CN is routed by the MM), or may be directly transferred by using an interface between the RAN and the SM (if there is a direct interface between the RAN and the SM).

In addition, optionally, in step 7b, a bearer context parameter of the UE may further be included.

Figure 14:
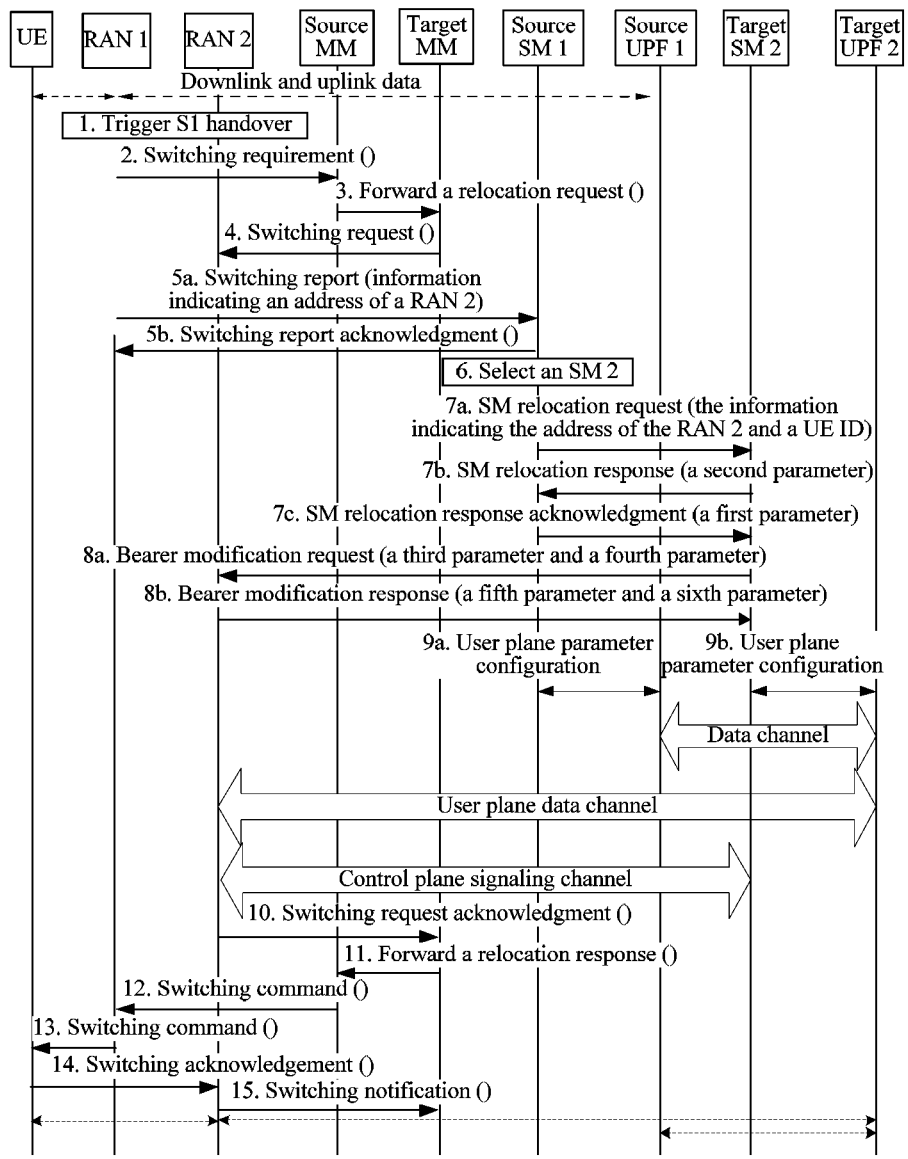
FIG. 14 is a flowchart of another handover method according to an embodiment of the present invention.

In FIG. 14, the RAN 2 and the SM 2 initiate a bearer update and setup process. After the RAN 2 performs step 8b, it means that a bearer is successfully updated. In this case, the RAN 2 sends a switching request acknowledgment to the target MM, and the target MM may consider that the RAN 2 successfully allocates an air interface radio resource to the UE and successfully updates the bearer, to continue to trigger subsequent steps.

It should be noted that optionally, messages in step 8a and step 8b may be routed by the target MM (if all signaling of the RAN and a core network CN is routed by the MM), or may be directly transferred by using an interface between the RAN and the SM (if there is a direct interface between the RAN and the SM). Messages in step 5a and step 5b may be routed by the source MM (if all signaling of the RAN and the core network CN is routed by the MM), or may be directly transferred by using an interface between the RAN and the SM (if there is a direct interface between the RAN and the SM).

It should be noted that optionally, step 5b may be omitted; or if there is step 5b, step 5b may be performed after step 7a to step 7c, step 8a, and step 8b are performed.

It should be noted that optionally, step 8a and 8b may be performed after step 7a and before step 7b.

In addition, optionally, in step 7a or step 7c, a bearer context parameter of the UE may further be included.

Figure 15:
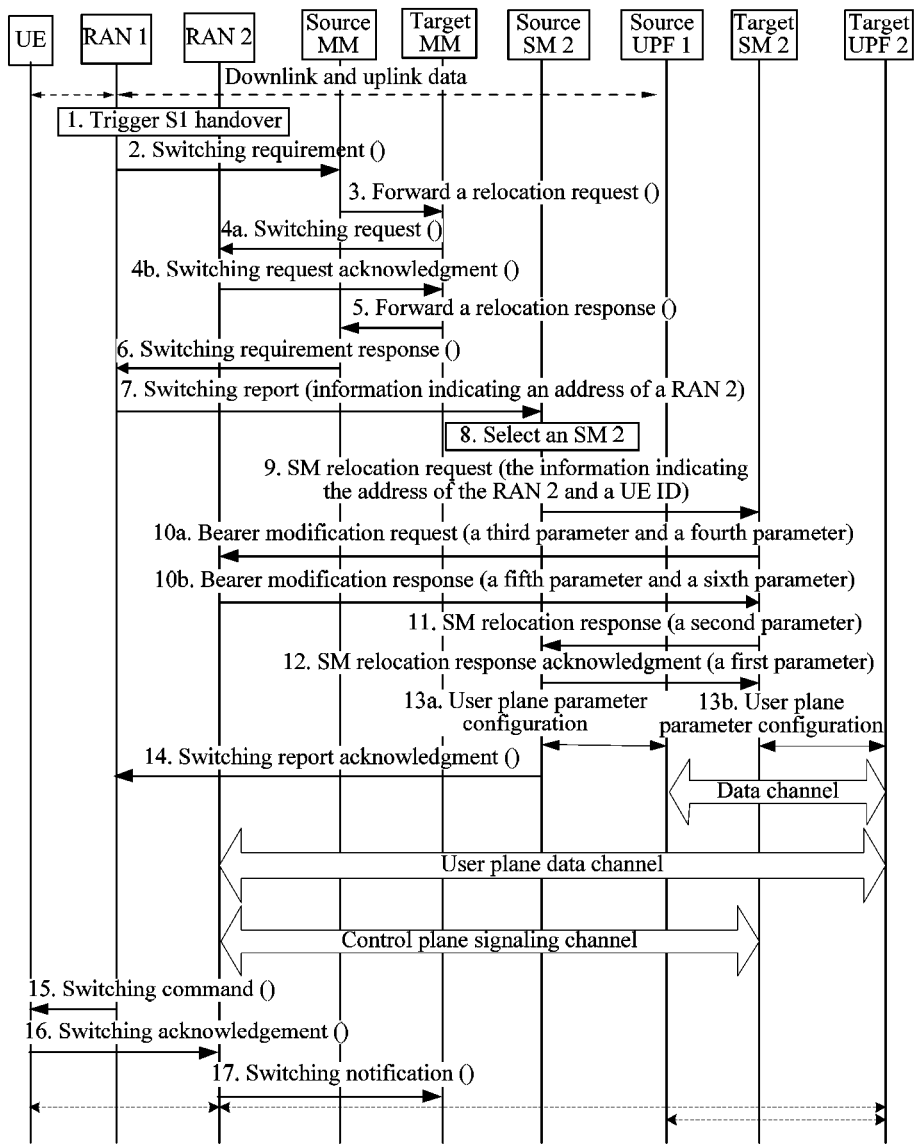
FIG. 15 is a flowchart of another handover method according to an embodiment of the present invention.

In FIG. 15, after receiving a switching request, the RAN 2 sends a switching request acknowledgment to the target MM. Then, the RAN 2 and the SM 2 initiate a bearer update and setup process. After the RAN 2 performs step 10b, it means that a bearer is successfully updated. In this case, the target SM 2 triggers subsequent steps. After receiving step 6 (if there is step 6) and step 14, the source RAN 1 may consider that the RAN 2 successfully allocates an air interface radio resource to the UE and successfully updates the bearer, to continue to trigger subsequent steps.

It should be noted that optionally, the source RAN 1 may be notified in step 4b, step 5 (if there is step 5), or step 6 (if there is step 6) that the RAN 2 allocates an air interface radio resource to the UE; or the source RAN 1 may be notified in step 10b, step 11, or step 14 that the RAN 2 allocates an air interface radio resource to the UE.

It should be noted that optionally, messages in step 7 and step 14 may be routed by the source MM (if all signaling of the RAN and a core network CN is routed by the MM, or may be directly transferred by using an interface between the RAN 1 and the SM 1 (if there is a direct interface between the RAN and the SM). Messages in step 10a and step 10b may be routed by the target MM (if all signaling of the RAN and the core network CN is routed by the MM), or may be directly transferred by using an interface between the RAN 2 and the SM 2 (if there is a direct interface between the RAN and the SM).

It should be noted that optionally, step 5 may be omitted; and step 6 may be omitted.

It should be noted that optionally, step 10a and step 10b may be performed after step 12.

In addition, optionally, in step 9 or step 12, a bearer context parameter of the UE may further be included.

Figure 16:
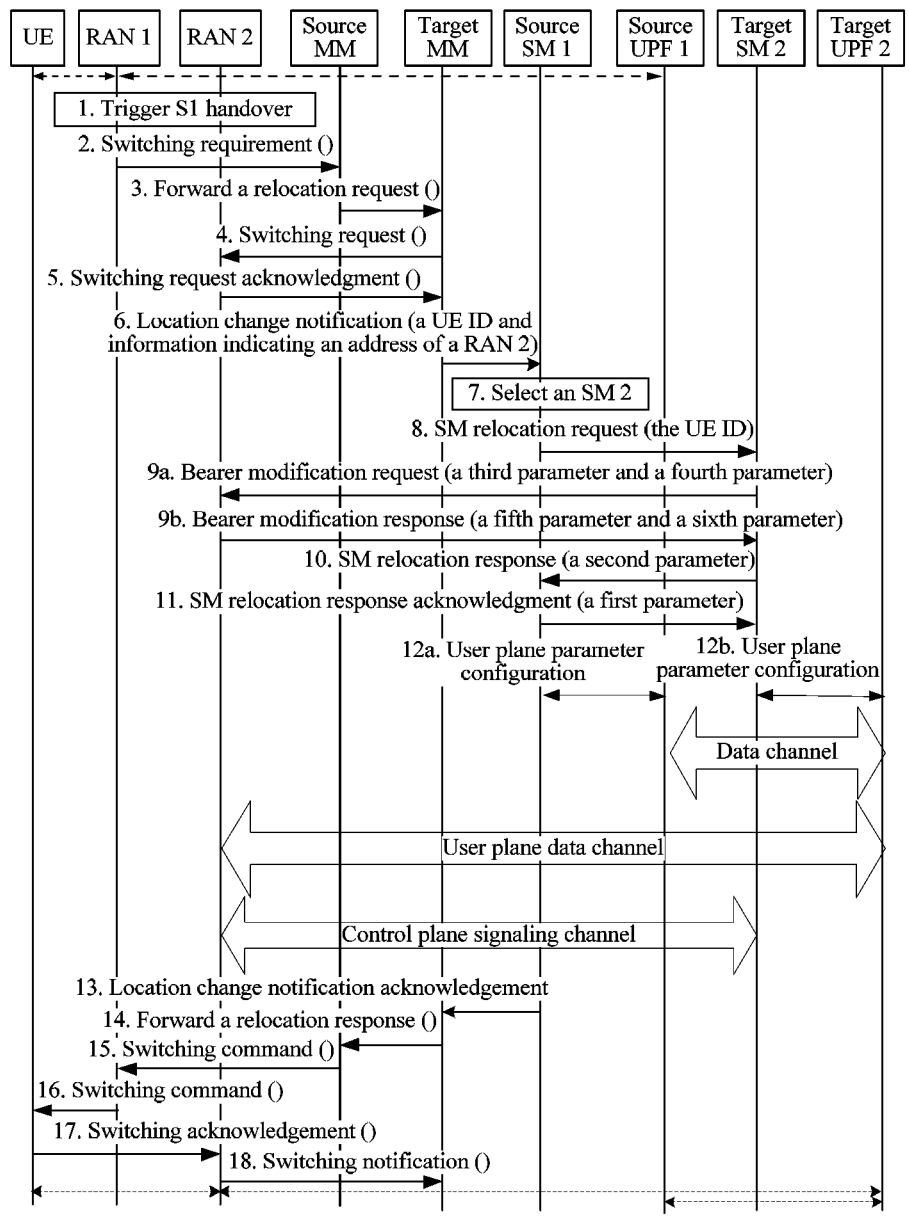
FIG. 16 is a flowchart of another handover method according to an embodiment of the present invention.

In FIG. 16, after receiving a switching request, the RAN 2 sends a switching request acknowledgment to the target MM. In addition, the target MM sends a location change notification to the source SM 1, to trigger the SM 1 to select the SM 2 and further trigger a bearer update and setup process between the SM 2 and the RAN 2. Then, the RAN 2 and the SM 2 initiate the bearer update and setup process, and after the RAN 2 performs step 9b, it means that a bearer is successfully updated. In this case, the target SM 2 triggers subsequent steps. After receiving step 13, the target MM may consider that the RAN 2 successfully allocates an air interface radio resource to the UE and successfully updates the bearer, to continue to trigger subsequent steps.

It should be noted that optionally, the target MM may be notified in step 5 that the RAN 2 allocates an air interface radio resource to the UE; or the target MM may be notified in step 9b, step 10, or step 13 that the RAN 2 allocates an air interface radio resource to the UE.

It should be noted that optionally, messages in step 9a and step 9b may be routed by the target MM (if all signaling of the RAN and a core network CN is routed by the MM), or may be directly transferred by using an interface between the RAN and the SM (if there is a direct interface between the RAN and the SM).

In addition, optionally, in step 8 or step 11, a bearer context parameter of the UE may further be included.

Figure 17:
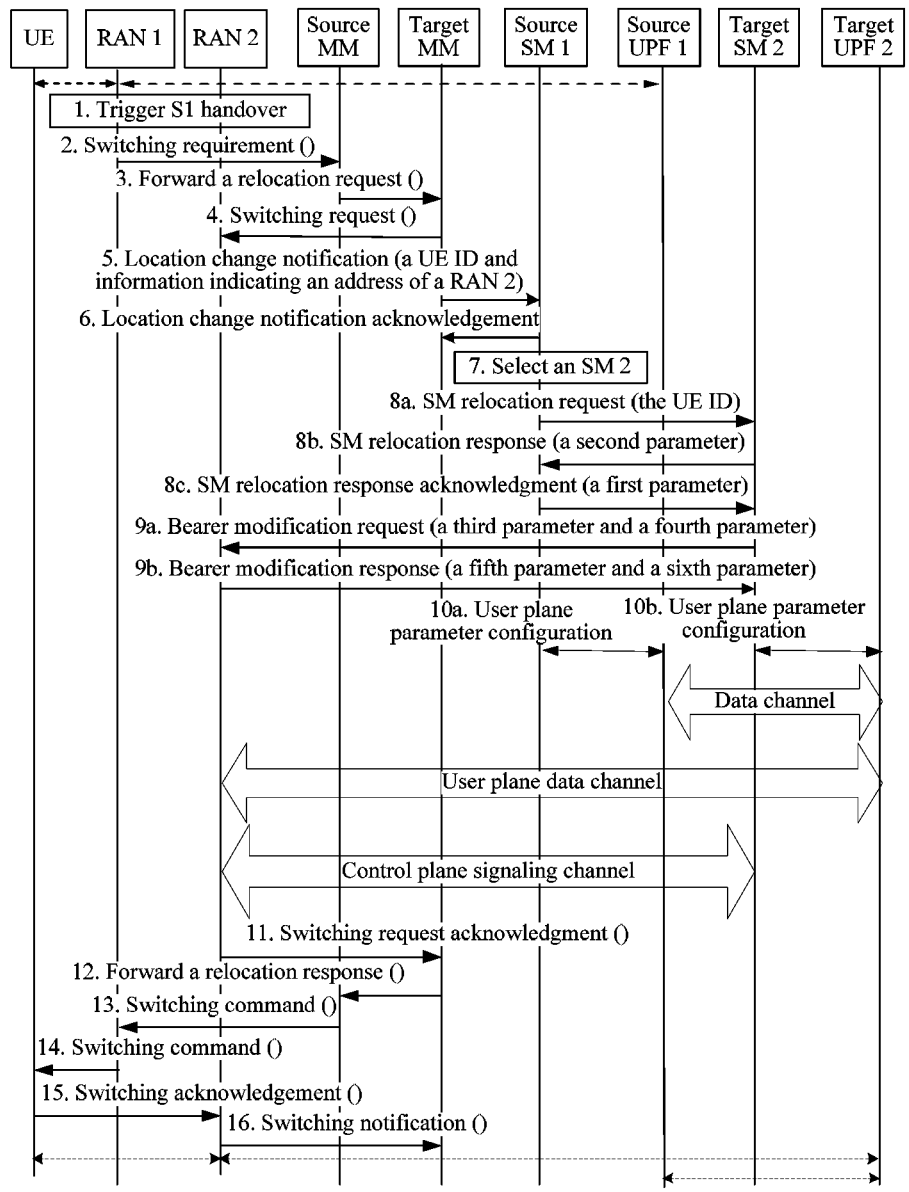
FIG. 17 is a flowchart of another handover method according to an embodiment of the present invention.

In FIG. 17, the target MM sends a switching request to the RAN 2. In addition, the target MM sends a location change notification to the source SM 1, to trigger the SM 1 to select the SM 2 and further trigger a bearer update and setup process between the SM 2 and the RAN 2.

Then, the RAN 2 and the SM 2 initiate the bearer update and setup process. After the RAN 2 performs step 9b, it means that a bearer is successfully updated. In this case, the RAN 2 returns a switching request acknowledgment to the target MM. After receiving a switching request acknowledgment in step 11, the target MM may consider that the RAN 2 successfully allocates an air interface radio resource to the UE and successfully updates the bearer, to continue to trigger subsequent steps.

It should be noted that optionally, step 6 may be omitted.

It should be noted that optionally, messages in step 9a and step 9b may be routed by the target MM (if all signaling of the RAN and a core network CN is routed by the MM), or may be directly transferred by using an interface between the RAN and the SM (if there is a direct interface between the RAN and the SM).

In addition, optionally, in step 8a or step 8c, a bearer context parameter of the UE may further be included.

Figure 18:
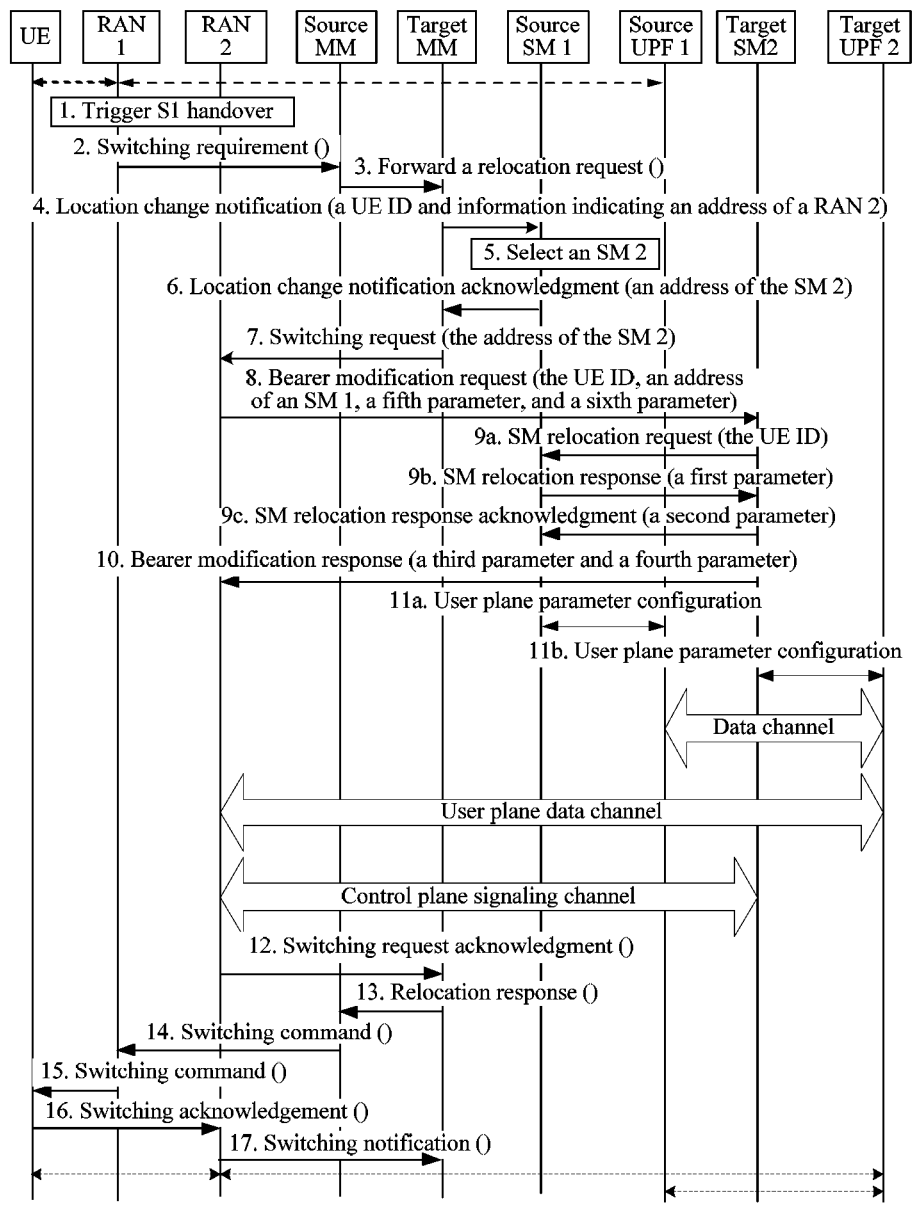
FIG. 18 is a flowchart of another handover method according to an embodiment of the present invention.

In FIG. 18, after selecting the target SM 2, the source SM 1 sends address information of the SM 2 to the RAN 2 in step 6 and step 7. Then, the RAN 2 and the SM 2 initiate a bearer update and setup process. After the RAN 2 receives step 10 returned by the SM 2, it means that a bearer is successfully updated. In this case, the RAN 2 returns a switching request acknowledgment to the target MM. After receiving step 12, the target MM may consider that the RAN 2 successfully allocates an air interface radio resource to the UE and successfully updates the bearer, to continue to trigger subsequent steps.

It should be noted that optionally, messages in step 8 and step 10 may be routed by the target MM (if all signaling of the RAN and a core network CN is routed by the MM), or may be directly transferred by using an interface between the RAN and the SM (if there is a direct interface between the RAN and the SM).

In addition, optionally, in step 9b, a bearer context parameter of the UE may further be included.

Figure 19:
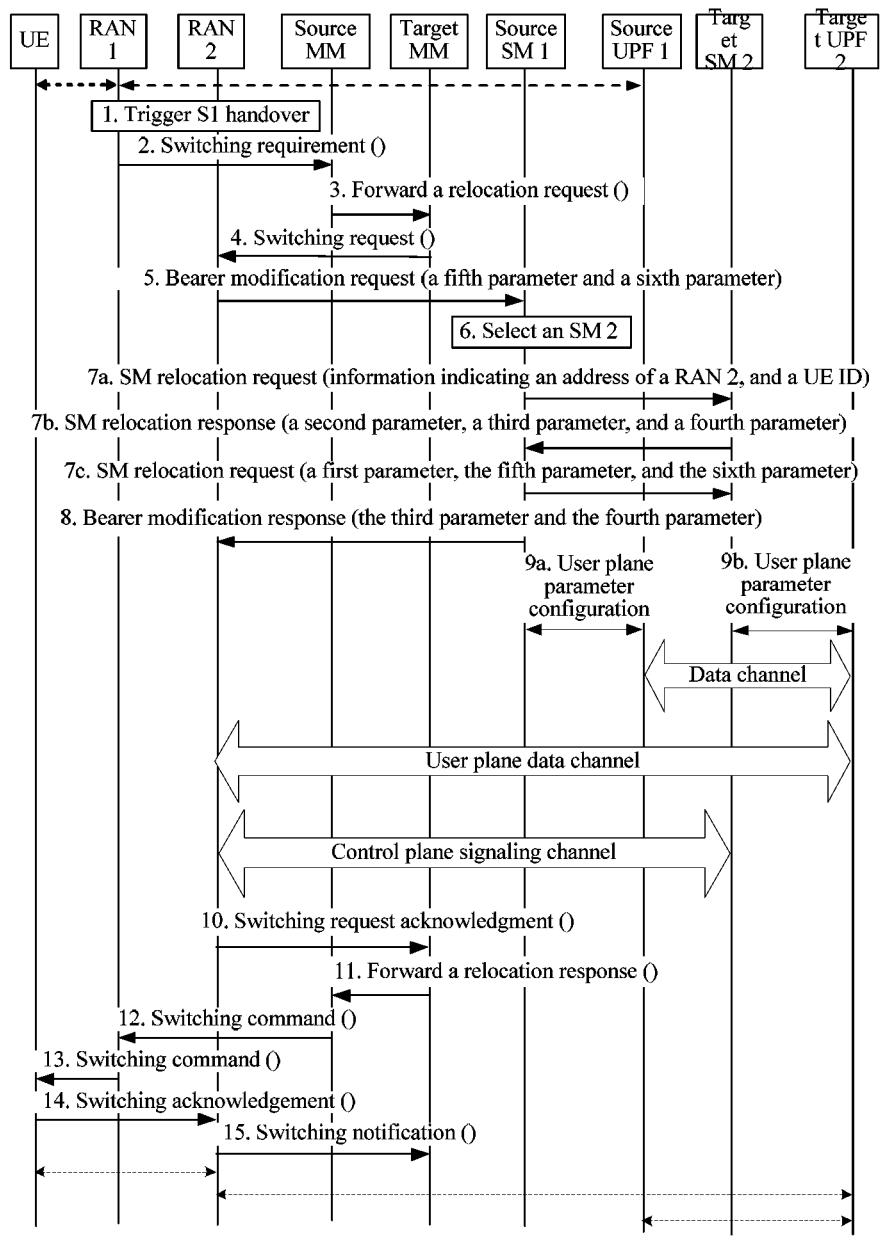
FIG. 19 is a flowchart of another handover method according to an embodiment of the present invention.

In FIG. 19, after receiving a switching request of the target MM, the RAN 2 and the SM 2 initiate a bearer update and setup process by using the SM 1. After the RAN 2 receives step 8, it means that a bearer is successfully updated. In this case, the RAN 2 returns a switching request acknowledgment to the target MM. After receiving step 10, the target MM may consider that the RAN 2 successfully allocates an air interface radio resource to the UE and successfully updates the bearer, to continue to trigger subsequent steps.

It should be noted that optionally, messages in step 5 and step 8 may be routed by the source MM or the target MM (if all signaling of the RAN and a core network CN is routed by the MM), or may be directly transferred by using an interface between the RAN and the SM (if there is a direct interface between the RAN and the SM).

In addition, optionally, in step 7a or step 7c, a bearer context parameter of the UE may further be included.

It should be noted that in the S1 handover procedures shown in FIG. 10 to FIG. 19, in addition to the steps shown in FIG. 10 to FIG. 19, steps of interaction between the SM 1 and the SM 2 may be simplified in two steps. For a specific manner of a two-step procedure, refer to descriptions of the embodiments for the X2 handover. Details are not described herein again.

Figure 20:
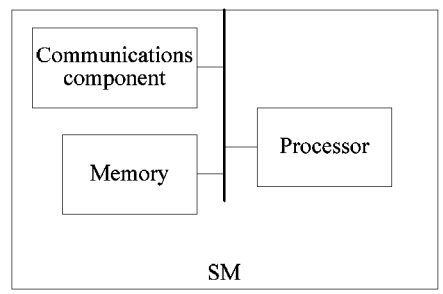
FIG. 20 is a schematic structural diagram of a mobility management network element according to an embodiment of the present invention.

FIG. 20 shows a mobility management network element according to an embodiment of this application. The mobility management network element includes a processor and a communications component, and optionally, may further include a memory. The processor is configured to: determine to hand over a session management SM for user equipment UE, and select a target session management SM network element. The communications component is configured to trigger a process of setting up a channel by the target SM network element.

For a specific function implementation process of the communications component, refer to FIG. 2 to FIG. 19, and details are not described herein again.

An embodiment of this application further discloses an SM network element, including a processor and a communications component. The SM network element may further include a memory. The processor is configured to: determine to hand over an SM for UE, and select a target SM network element. The communications component is configured to trigger a process of setting up a channel by the target SM network element.

For a specific function implementation process of the communications component, refer to FIG. 2 to FIG. 19, and details are not described herein again. It should be noted that actually the SM network element may be a source SM network element or a target SM network element. For a process of setting up each channel by the target SM network element, refer to FIG. 2 to FIG. 19.

An embodiment of this application further discloses a base station, including a processor and a communications component. The processor is configured to: determine to hand over an SM for UE, and select a target SM network element. The communications component is configured to trigger a process of setting up a channel by the target SM network element.

For a specific function implementation process of the communications component, refer to FIG. 2 to FIG. 19, and details are not described herein again.

What is claimed is:

1. A handover method, comprising:
    determining, by a mobility management network element, to hand over a session management (SM) for a user equipment (UE), and selecting a target SM network element; and
    triggering, by the mobility management network element, a process of setting up a channel by the target SM network element, wherein the channel comprises a user plane data channel between a target user plane function entity and a target base station; wherein the triggering comprises:
    sending, by the mobility management network element to a source SM network element, a user equipment identifier (UE ID), information indicating an address of the target base station, an address of the target SM network element, and a parameter used to set up the user plane data channel between the target user plane function entity and the target base station and used for downlink transmission, wherein the information indicating the address of the target base station comprises the address of the target base station or information to be mapped to the address of the target base station, to enable the source SM network element to send the UE ID, the information indicating the address of the target base station, and the parameter to the target SM network element based on the address of the target SM network element.

2. The method according to claim 1, wherein the process of setting up the channel by the target SM network element comprises:
    exchanging, by the target SM network element, the parameter with the target base station based on the address of the target base station or the information to be mapped to the address of the target base station.

3. The method according to claim 1 wherein the process of setting up the channel by the target SM network element comprises:

sending, by the target SM network element to the target base station, a parameter used to set up the user plane data channel between the target user plane function entity and the target base station and used for uplink transmission.

4. The method according to claim 1, wherein the triggering, by the mobility management network element, a process of setting up a channel by the target SM network element further comprises:

sending, by the source SM network element, the UE ID, the information indicating the address of the target base station, and the parameter used to set up the user plane data channel between the target user plane function entity and the target base station and used for downlink transmission, to the target SM network element based on the address of the target SM network element.

5. The method according to claim 4, wherein the process of setting up the channel by the target SM network element comprises:

sending, by the target SM network element, a parameter used to set up the user plane data channel between the target user plane function entity and the target base station and used for uplink transmission, to the target base station by using the source SM network element and the mobility management network element based on the address of the target base station or the information to be mapped to the address of the target base station.

6. The method according to claim 1, wherein before the determining, by a mobility management network element, to hand over an SM for UE, and selecting a target SM network element, the method further comprises:

receiving, by the mobility management network element, the parameter that is sent by the target base station and that is used to set up the user plane data channel between the target user plane function entity and the target base station and used for downlink transmission.

7. The method according to claim 1, wherein the channel further comprises:

a data channel between a source user plane function entity and the target user plane function entity.

8. The method according to claim 7, wherein the process of setting up the channel by the target SM network element further comprises:

exchanging, by the target SM network element with the source SM network element, a parameter used to set up the data channel between the source user plane function entity and the target user plane function entity.

9. The method according to claim 8, further comprising:

receiving, by the target SM network element, a bearer context related parameter of the UE sent by the source SM network element.

10. The method according to claim 1, wherein the channel further comprises:

a control plane signaling channel between the target SM network element and the target base station.

11. The method according to claim 10, wherein the process of setting up the channel by the target SM network element further comprises:

exchanging, by the target SM network element with the target base station, a parameter used to set up the control plane signaling channel between the target user plane function entity and the target base station.

12. A mobility management network element, comprising:

a processor, configured to: determine to hand over a session management (SM) for a user equipment (UE), and select a target SM network element; and a communications component, configured to trigger a process of setting up a channel by the target SM network element, wherein the channel comprises a user plane data channel between a target user plane function entity and a target base station, by sending a user equipment identifier (UE ID), information indicating an address of the target base station, an address of the target SM network element to a source SM network element, and a parameter used to set up the user plane data channel between the target user plane function entity and the target base station and used for downlink transmission to enable the source SM network element to send the UE ID, the information indicating the address of the target base station, and the parameter used to set up the user plane data channel between the target user plane function entity and the target base station and used for downlink transmission, to the target SM network element based on the address of the target SM network element, wherein the information indicating the address of the target base station comprises the address of the target base station or information to be mapped to the address of the target base station.

13. The mobility management network element according to claim 12, wherein the communications component is further configured to:

before the processor determines to hand over an SM for the UE and selects the target SM, receive the parameter that is sent by the target base station and that is used to set up the user plane data channel between the target user plane function entity and the target base station and used for downlink transmission.

14. The method according to claim 12, wherein the channel further comprises:

a data channel between a source user plane function entity and the target user plane function entity.

15. A non-transitory computer readable storage medium storing a program to be executed by a processor, the program including instructions to:

determine hand over a session management (SM) for a user equipment (UE), and select a target SM network element; and trigger a process of setting up a channel by the target SM network element, wherein the channel comprises a user plane data channel between a target user plane function entity and a target base station, by:

sending, to a source SM network element, a user equipment identifier (UE ID), information indicating an address of the target base station, an address of the target SM network element, and a parameter used to set up the user plane data channel between the target user plane function entity and the target base station and used for downlink transmission, wherein the information indicating the address of the target base station comprises the address of the target base station or information to be mapped to the address of the target base station, to enable the source SM network element to send the UE ID, the information indicating the address of the target base station, and the parameter to the target SM network element based on the address of the target SM network element.

* * * * *

UNITED STATES PATENT AND TRADEMARK OFFICE
CERTIFICATE OF CORRECTION

| | |
|---|---|
| PATENT NO. | : 10,959,132 B2 |
| APPLICATION NO. | : 16/234857 |
| DATED | : March 23, 2021 |
| INVENTOR(S) | : Ying et al. |

It is certified that error appears in the above-identified patent and that said Letters Patent is hereby corrected as shown below:

In the Claims

Claim 3: Column 18, Line 65: "The method according to claim 1 wherein the process" should read -- The method according to claim 1, wherein the process --.

Signed and Sealed this
Twenty-sixth Day of April, 2022

*Katherine Kelly Vidal*
Katherine Kelly Vidal
*Director of the United States Patent and Trademark Office*